(12) United States Patent
Nakamura et al.

(10) Patent No.: US 9,422,044 B2
(45) Date of Patent: Aug. 23, 2016

(54) VESSEL PROPULSION APPARATUS

(71) Applicant: YAMAHA HATSUDOKI KABUSHIKI KAISHA, Iwata-shi, Shizuoka (JP)

(72) Inventors: Daisuke Nakamura, Shizuoka (JP); Yoshihito Fukuoka, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 34 days.

(21) Appl. No.: 14/576,590

(22) Filed: Dec. 19, 2014

(65) Prior Publication Data

US 2015/0225054 A1   Aug. 13, 2015

(30) Foreign Application Priority Data

Feb. 7, 2014   (JP) .................. 2014-022475

(51) Int. Cl.
  *B63H 20/32*  (2006.01)
  *B63H 20/00*  (2006.01)
  *B63H 20/14*  (2006.01)
  *F16H 57/04*  (2010.01)

(52) U.S. Cl.
  CPC ............. *B63H 20/002* (2013.01); *B63H 20/14* (2013.01); *F16H 57/043* (2013.01); *F16H 57/0409* (2013.01); *F16H 57/0486* (2013.01)

(58) Field of Classification Search
  CPC ................................. B63H 20/00; B63H 20/32
  USPC ...................... 440/75, 88 L, 88; 1/1
  See application file for complete search history.

(56) References Cited

U.S. PATENT DOCUMENTS

| | | | | |
|---|---|---|---|---|
| 5,352,141 A | * | 10/1994 | Shields .................. | B63H 23/34 416/129 |
| 5,514,014 A | * | 5/1996 | Ogino .................... | B63H 23/02 440/75 |
| 8,075,357 B2 | * | 12/2011 | Fukuoka .............. | B63H 20/002 440/75 |
| 8,147,285 B2 | * | 4/2012 | Okabe .................... | B63H 23/08 440/75 |
| 8,616,929 B2 | * | 12/2013 | Kawaguchi ............ | B63H 20/20 440/75 |
| 8,821,335 B2 | * | 9/2014 | Nakamura ............. | B63H 20/14 475/230 |
| 2009/0298361 A1 | * | 12/2009 | Nakamura ............. | B63H 20/20 440/75 |
| 2015/0225054 A1 | * | 8/2015 | Nakamura ........... | B63H 20/002 440/75 |

FOREIGN PATENT DOCUMENTS

| | | |
|---|---|---|
| JP | 2010-006361 A | 1/2010 |
| JP | 2010-203494 A | 9/2010 |

* cited by examiner

*Primary Examiner* — Lars A Olson
*Assistant Examiner* — Jovon Hayes
(74) *Attorney, Agent, or Firm* — Keating and Bennett, LLP

(57) ABSTRACT

A vessel propulsion apparatus includes a drive shaft that is rotationally driven by a prime mover, a drive gear connected to the drive shaft, a front gear that engages the drive gear, a rear gear that engages the drive gear and that is disposed behind the front gear, a dog clutch that selectively engages one of the front gear and the rear gear, and an oil passage that passes through the inside of the front gear and that guides oil from a forward space in front of the front gear to a rearward space behind the front gear.

12 Claims, 10 Drawing Sheets

VESSEL PROPULSION APPARATUS

BACKGROUND OF THE INVENTION

1. Field of the Invention

The present invention relates to a vessel propulsion apparatus that propels a vessel.

2. Description of the Related Art

U.S. Pat. No. 8,147,285 discloses a vessel propulsion apparatus that includes an outboard motor. The outboard motor includes a drive shaft that is rotationally driven by an engine, a drive gear that is connected to the drive shaft, a front gear and a rear gear both of which engage the drive gear, and a dog clutch that selectively engages either one of the front and rear gears. The outboard motor further includes an intermediate shaft member that rotates together with the dog clutch, a propeller shaft that rotates together with a propeller, and a planetary gear mechanism that transmits the rotation of the intermediate shaft member to the propeller shaft.

As shown in FIG. 4 of U.S. Pat. No. 8,147,285, an oil passage of the outboard motor includes a through hole that passes through the intermediate shaft member in a radial direction and an oil passage portion that extends rearwardly from the through hole of the intermediate shaft member along a center line of the intermediate shaft member. The oil passage of the outboard motor further includes a main passage that extends rearwardly from a front end surface of the propeller shaft along a center line of the propeller shaft and a plurality of branch passages that diverge from the main passage inside the propeller shaft. The dog clutch is disposed around the through hole of the intermediate shaft member, and the planetary gear mechanism is disposed around the branch passages of the propeller shaft.

U.S. Pat. No. 8,147,285 discloses that oil is supplied to the planetary gear mechanism via the branch passages of the propeller shaft. Oil to be supplied to the branch passages is allowed to flow from the through hole, which opens at an outer peripheral surface of the intermediate shaft member, into the intermediate shaft member, and is guided to the branch passages by the main passage of the propeller shaft. The through hole of the intermediate shaft member that is equivalent to an oil inlet is disposed so as to open in a space between the front gear and the rear gear in a front-rear direction. However, in this outboard motor, a plurality of members, such as the drive gear and the dog clutch, are disposed around the through hole of the intermediate shaft member that is equivalent to an oil inlet, and thus the route of oil around the oil inlet is complex, and the flow of oil toward the oil inlet is obstructed by the plurality of members. Additionally, the space in front of the front gear and the space behind the front gear are partitioned by the front gear, and thus the flow of oil in both spaces is low.

SUMMARY OF THE INVENTION

In order to overcome the previously unrecognized and unsolved challenges described above, one preferred embodiment of the present invention provides a vessel propulsion apparatus that includes a prime mover that generates power by which a propeller is rotated, a drive shaft rotationally driven by the prime mover, a drive gear connected to the drive shaft, a front gear that engages the drive gear, a rear gear that engages the drive gear and that is disposed behind the front gear, a dog clutch that moves in a front-rear direction of the vessel propulsion apparatus between an engagement position in which the dog clutch engages either the front gear or the rear gear and a non-engagement position in which the dog clutch engages neither the front gear nor the rear gear, and an oil passage that passes through an inside of the front gear and that guides oil from a forward space in front of the front gear to a rearward space behind the front gear.

According to this arrangement, the power of the prime mover is transmitted to the front gear and to the rear gear through the drive shaft and through the drive gear. The front and rear gears that engage the drive gear are arranged in the front-rear direction, and the dog clutch that selectively engages one of the front and rear gears is disposed between the front gear and the rear gear in the front-rear direction.

The oil passage extends from the forward space in front of the front gear to the rearward space behind the front gear. Oil is guided by the oil passage from the forward space to the rearward space. Thus, the flow of oil from the forward space to the rearward space is improved.

Additionally, the oil passage is disposed not around the front gear but inside the front gear. When the oil passage passes around (i.e., outside) the front gear, the oil passage is complex, and thus fluid resistance applied to the oil flowing through the oil passage increases. On the other hand, when the oil passage is disposed inside the front gear, the oil passage preferably has a linear or substantially linear shape, and thus fluid resistance applied to the oil decreases as compared to a case in which the oil passage passes around the front gear. Accordingly, the flow of oil is improved.

In a preferred embodiment, the oil passage preferably includes an oil inlet disposed in front of the front gear.

According to this arrangement, the oil inlet of the oil passage is disposed in front of the front gear. When the oil inlet is disposed inside the front gear, oil will not flow into the oil inlet if the oil does not move to the inside of the front gear from in front of the front gear. Therefore, the oil in front of the front gear is reliably guided into the oil inlet by disposing the oil inlet in front of the front gear. As a result, the oil is reliably guided by the oil passage from the forward space to the rearward space via the inside of the front gear.

In a preferred embodiment of the present invention, the vessel propulsion apparatus preferably further includes a cylindrical shift slider that rotates together with the dog clutch around a propeller axis extending in the front-rear direction and that moves in the front-rear direction together with the dog clutch. In this case, the oil inlet preferably opens at a front end surface of the shift slider.

When the oil inlet of the oil passage is open at an outer peripheral surface of the cylindrical shift slider that moves in the front-rear direction together with the dog clutch, oil will not flow into the oil inlet if the flow of oil does not occur toward the inside of the shift slider in the radial direction. However, the shift slider rotates together with the dog clutch, and thus the flow of oil toward the outside in the radial direction is created by centrifugal force (i.e., outward force in the radial direction). Therefore, when the oil inlet is open at the outer peripheral surface of the shift slider, it is difficult for oil to flow into the oil inlet.

On the other hand, when the oil inlet is open at the front end surface of the shift slider, the inflow of oil into the oil inlet is not easily obstructed by centrifugal force. Additionally, when the vessel propulsion apparatus accelerates the vessel forwardly, oil flows rearwardly with respect to the shift slider due to inertia. When the oil inlet is open at the front end surface of the shift slider, oil that is present in front of the shift slider flows toward the oil inlet when the vessel is accelerated forwardly. As a result, the inflow of oil into the oil inlet is facilitated.

In a preferred embodiment of the present invention, the oil inlet is preferably disposed on the propeller axis.

According to this arrangement, the oil inlet is open at the front end surface of the shift slider, and is disposed at a position at which it intersects the propeller axis. The shift slider rotates around the propeller axis. When the oil inlet is open at the outer peripheral surface of the shift slider, a flow of oil that flows into the oil passage from the oil inlet is obstructed by centrifugal force. Thus, the flow of the oil is less likely to be obstructed by centrifugal force than a case in which the oil inlet is open at the outer peripheral surface of the shift slider. Therefore, oil is efficiently supplied into the oil passage.

In a preferred embodiment of the present invention, the oil passage preferably further includes an oil outlet that is disposed behind the front gear and that discharges oil that has flowed into the oil inlet. In this case, the oil outlet is preferably disposed at a more outward position than the oil inlet in a radial direction of the shift slider.

According to this arrangement, the oil inlet is open at the front end surface of the shift slider that is rotatable around the propeller axis, and the oil outlet that discharges oil that has flowed into the oil inlet is disposed behind the front gear. The oil outlet is disposed at a more outward position in the radial direction than the oil inlet. Therefore, the flow of oil toward the oil outlet in the oil passage is accelerated by centrifugal force. Additionally, oil is discharged from the oil outlet, and thus the inflow of oil into the oil inlet is facilitated. As a result, the inflow of oil into the oil inlet is facilitated, and the outflow of oil from the oil outlet is facilitated, and thus the flow of oil is improved.

In a preferred embodiment, the vessel propulsion apparatus preferably further includes a cylindrical shift slider that rotates together with the dog clutch around a propeller axis extending in the front-rear direction and that moves together with the dog clutch in the front-rear direction, and a sleeve that extends in the front-rear direction in the shift slider. In this case, a portion of the oil passage is preferably defined by the sleeve.

According to this arrangement, the sleeve extending in the front-rear direction is disposed inside the shift slider. The inner peripheral surface of the sleeve defines a portion of the oil passage. Therefore, oil that has flowed into the shift slider passes through the inside of the sleeve, which is a portion of the oil passage, before being discharged from the oil outlet. This makes it possible to dispose another member (sleeve) in the shift slider without obstructing the flow of oil toward the oil outlet from the oil inlet.

In a preferred embodiment of the present invention, the rearward space preferably includes a space between the front gear and the rear gear in the front-rear direction.

According to this arrangement, oil that is present in front of the front gear is guided by the oil passage to the space between the front gear and the rear gear in the front-rear direction. Therefore, oil is reliably supplied to a movable member, such as the drive gear, that is disposed between the front gear and the rear gear.

In a preferred embodiment of the present invention, the rearward space preferably includes a space behind the rear gear.

According to this arrangement, oil that is present in front of the front gear is guided by the oil passage to the space behind the rear gear. Therefore, oil is supplied to a movable member disposed behind the rear gear.

In a preferred embodiment of the present invention, the vessel propulsion apparatus preferably further includes a decelerating mechanism that decelerates rotation transmitted to the dog clutch from either the front gear or the rear gear and that transmits decelerated rotation toward the propeller. In this case, the decelerating mechanism is preferably disposed behind the rear gear.

According to this arrangement, rotation transmitted from the dog clutch to the propeller is decelerated by the decelerating mechanism. As a result, the torque transmitted to the propeller increases. The decelerating mechanism includes a plurality of gears that move with respect to the lower case that contains the front gear and the like. The decelerating mechanism is disposed in a space behind the rear gear. The oil outlet of the oil passage is disposed in a space behind the rear gear. Therefore, oil is reliably supplied to the decelerating mechanism.

In a preferred embodiment of the present invention, the decelerating mechanism is preferably a planetary gear mechanism including a sun gear, a plurality of planet gears disposed around the sun gear, a ring gear disposed around the plurality of planet gears, and a carrier that rotatably holds the plurality of planet gears.

In a preferred embodiment of the present invention, a portion of the oil passage is preferably defined by the decelerating mechanism.

According to this arrangement, the decelerating mechanism defines a portion of the oil passage. Oil in the oil passage passes through the inside of the decelerating mechanism, which is a portion of the oil passage, before being discharged from the oil outlet. Therefore, oil in the oil passage is reliably supplied to the inside of the decelerating mechanism. The planetary gear mechanism, as an example of the decelerating mechanism, has a complex internal route, and thus oil does not easily flow in and out. Therefore, oil is reliably supplied to the inside of the decelerating mechanism even if the decelerating mechanism is a planetary gear mechanism.

In a preferred embodiment of the present invention, the vessel propulsion apparatus preferably further includes a propeller shaft that rotates together with the propeller around a propeller axis extending in the front-rear direction. In this case, a portion of the oil passage is defined by the propeller shaft.

According to this arrangement, the propeller shaft rotating together with the propeller around the propeller axis defines a portion of the oil passage. Oil in the oil passage passes through the inside of the propeller shaft, which is a portion of the oil passage, before being discharged from the oil outlet. Therefore, oil is reliably supplied to movable members (e.g., the decelerating mechanism and the bearing) that are disposed around the propeller shaft by disposing the oil outlet at the outer peripheral surface of the propeller shaft.

The above and other elements, features, steps, characteristics and advantages of the present invention will become more apparent from the following detailed description of the preferred embodiments with reference to the attached drawings.

DETAILED DESCRIPTION OF PREFERRED EMBODIMENTS

First Preferred Embodiment

Figure 1:
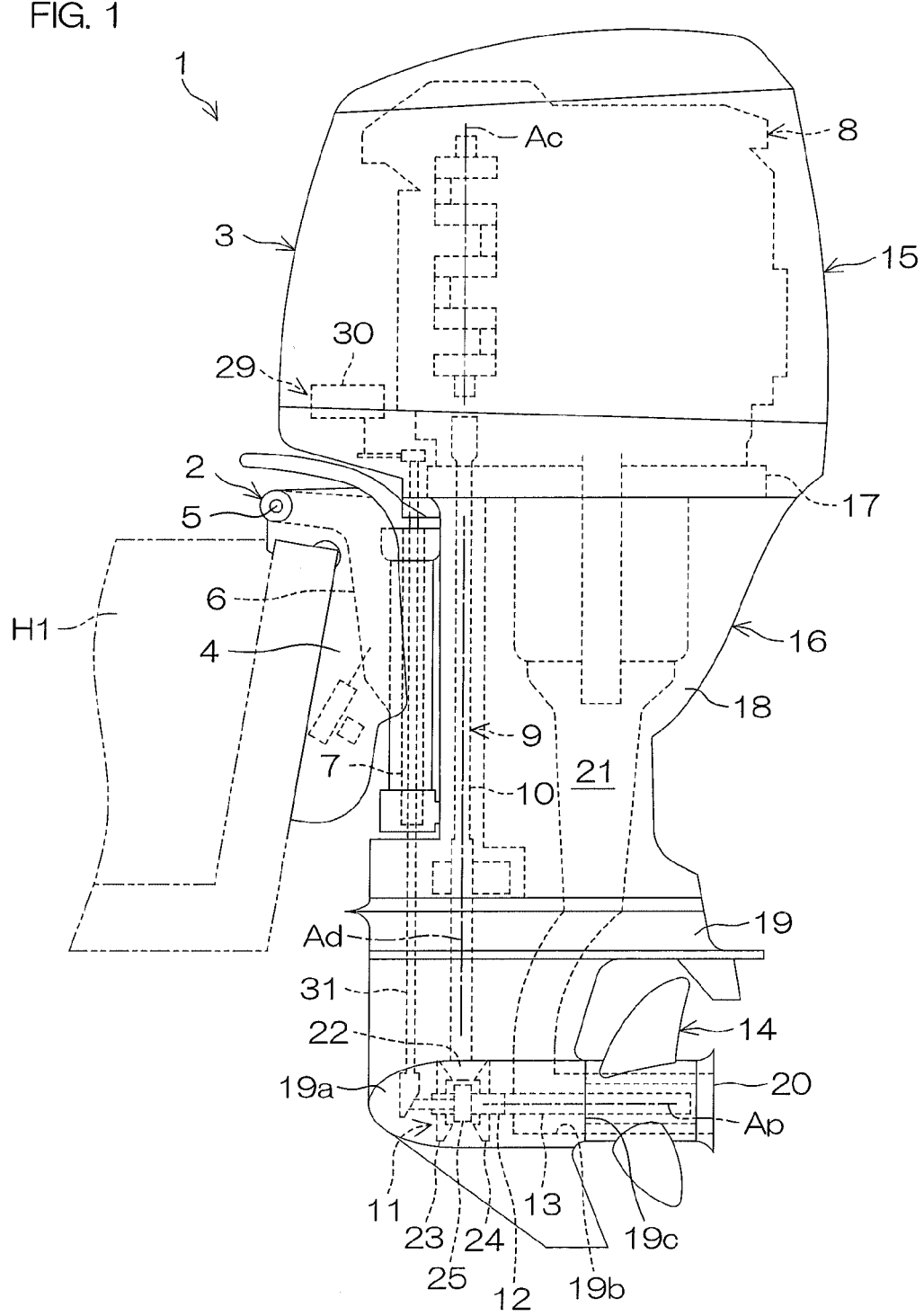
FIG. 1 is a schematic view showing a left side surface of a vessel propulsion apparatus according to a first preferred embodiment of the present invention.

As shown in FIG. 1, a vessel propulsion apparatus 1 includes a suspension device 2 attachable to a rear portion (stern) of a hull H1 and an outboard motor 3 connected to the suspension device 2.

The suspension device 2 includes a pair of left and right clamp brackets 4 attached to the hull H1 and a tilting shaft 5 supported by the pair of clamp brackets 4 in an orientation extending in a right-left direction. The suspension device 2 further includes a swivel bracket 6 attached to the tilting shaft 5 and a steering shaft 7 supported by the swivel bracket 6 in an orientation extending in an up-down direction.

The outboard motor 3 is attached to the steering shaft 7. The steering shaft 7 is rotatably supported by the swivel bracket 6 around a steering axis (i.e., a center line of the steering shaft 7) that extends in the up-down direction. The swivel bracket 6 is supported by the clamp bracket 4 through the tilting shaft 5. The swivel bracket 6 is turnable around a tilt axis (i.e., a center line of the tilting shaft 5) that extends in the right-left direction with respect to the clamp bracket 4. The outboard motor 3 is turnable rightwardly and leftwardly with respect to the hull H1, and is turnable upwardly and downwardly with respect to the hull H1.

The outboard motor 3 includes an engine 8 that is an example of a prime mover and that generates power by which the propeller 14 is rotated and a power transmitting mechanism 9 that transmits the power of the engine 8 to the propeller 14. The outboard motor 3 further includes an engine cover (engine cowling) 15 with which the engine 8 is covered and a casing 16 that contains the power transmitting mechanism 9.

The casing 16 includes an exhaust guide 17 disposed below the engine 8, an upper case 18 disposed below the exhaust guide 17, and a lower case 19 disposed below the upper case 18. The lower case 19 includes a cylindrical torpedo portion 19a that extends in a front-rear direction. The torpedo portion 19a is a portion disposed in the water. The torpedo portion 19a includes a closed front end, a rearwardly-open rear end, and a cylindrical inner surface 19b disposed between the front end and the rear end. The inner surface 19b of the torpedo portion 19a surrounds a propeller axis Ap.

The power transmitting mechanism 9 includes a drive shaft 10 to which the rotation of the engine 8 is transmitted, a forward/backward switching mechanism 11 to which the rotation of the drive shaft 10 is transmitted, an intermediate shaft 12 to which the rotation of the forward/backward switching mechanism 11 is transmitted, and a propeller shaft 13 to which the rotation of the intermediate shaft 12 is transmitted.

The drive shaft 10 extends in the up-down direction in the casing 16. The drive shaft 10 is rotatable around a drive axis Ad (i.e., a center line of the drive shaft 10) with respect to the casing 16. The lower end portion of the drive shaft 10 is connected to the forward/backward switching mechanism 11. The intermediate shaft 12 is rotatably supported by the forward/backward switching mechanism 11 around a propeller axis Ap (i.e., a center line of the propeller shaft 13). The intermediate shaft 12 is disposed on the propeller axis Ap. The propeller shaft 13 extends in the front-rear direction behind the intermediate shaft 12. The rear end portion of the propeller shaft 13 protrudes rearwardly from the torpedo portion 19a of the lower case 19.

The propeller 14 is detachably attached to the rear end portion of the propeller shaft 13. The propeller 14 is rotatable around the propeller axis Ap together with the propeller shaft 13. The propeller 14 has normal rotation specifications in which a thrust in a forward direction is generated by rotating in a normal rotation direction (e.g., clockwise when seen from behind). The propeller 14 may have reverse rotation specifications in which a thrust in the forward direction is generated by rotating in a reverse rotation direction that is opposite to the normal rotation direction.

The engine 8 is, for example, an internal combustion engine. The engine 8 rotates in a predetermined rotation direction. The exhaust guide 17, which defines and serves as an engine supporting member, supports the engine 8 in an orientation in which a rotational axis Ac of the engine 8 (i.e., a rotational axis of a crankshaft) is vertical. The rotation of the engine 8 (i.e., the rotation of the crankshaft) is transmitted to the propeller 14 by the power transmitting mechanism 9. As a result, the propeller 14 rotates together with the propeller shaft 13, and a thrust that propels a vessel forwardly or backwardly is generated. Additionally, the direction of rotation transmitted from the drive shaft 10 to the intermediate shaft 12 is switched by the forward/backward switching mechanism 11. The propeller 14 and the propeller shaft 13 rotate in the same direction as the intermediate shaft 12. Therefore, the rotation direction of the propeller 14 is switched between the normal rotation direction and the reverse rotation direction. As a result, the direction of a thrust is switched.

The outboard motor 3 includes a main exhaust passage 21 that guides exhaust gases of the engine 8 to a main exhaust port 20 that is open in the water. The main exhaust passage 21 extends downwardly from the engine 8 to the propeller shaft 13, and is connected to the main exhaust port 20 that is rearwardly open at the rear end portion of the propeller 14.

Figure 2:
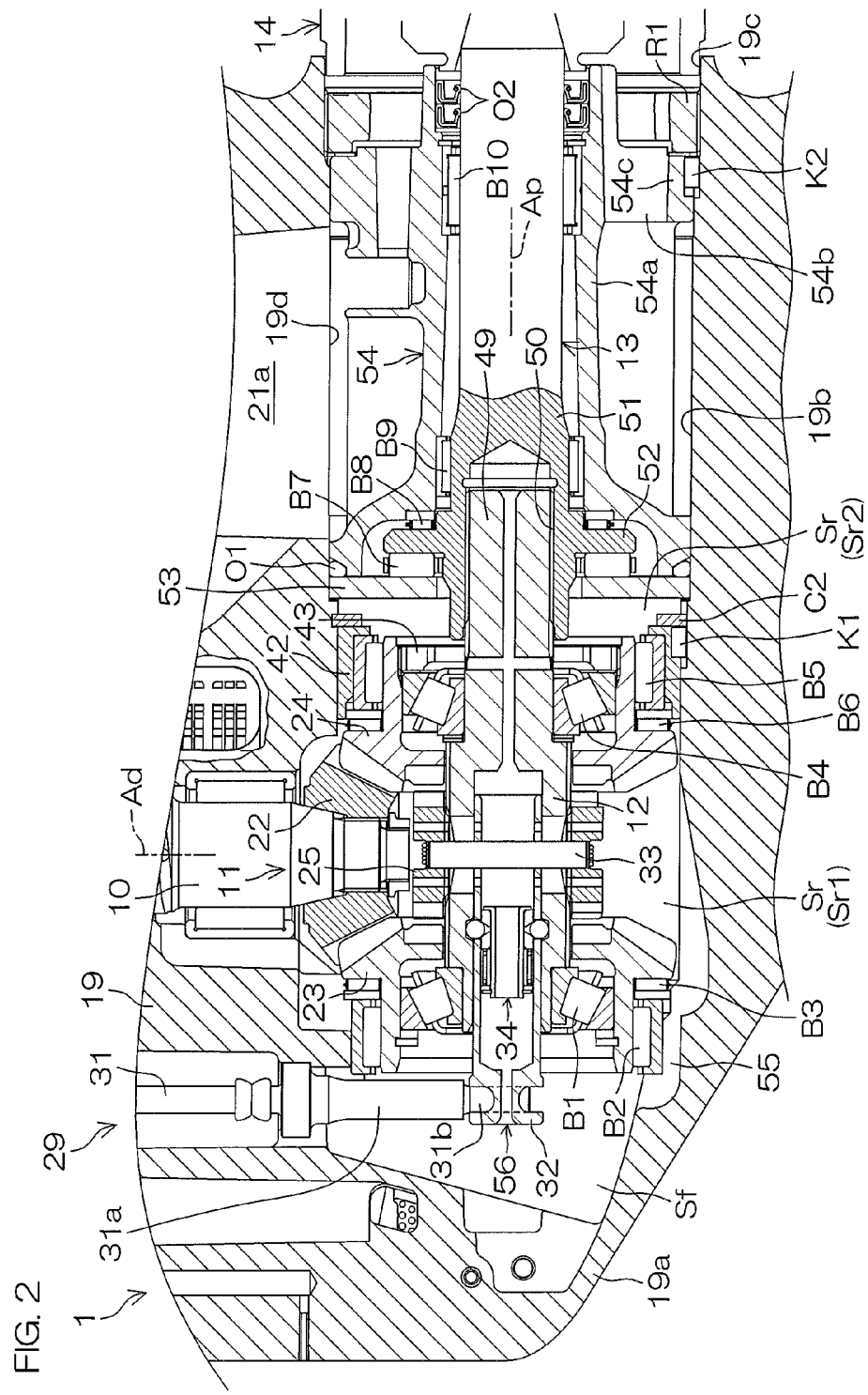
FIG. 2 is a cross-sectional view showing the inside of a lower unit of an outboard motor shown in FIG. 1.

As shown in FIG. 2, the forward/backward switching mechanism 11 includes a drive gear 22 that rotates around the drive axis Ad together with the drive shaft 10, a cylindrical front gear 23 and a cylindrical rear gear 24 both of which engage the drive gear 22, and a cylindrical dog clutch 25 that selectively engages either one of the front gear 23 and the rear gear 24.

The drive gear 22 is connected to the lower end portion of the drive shaft 10. The drive gear 22 is disposed on the drive axis Ad. The front gear 23 is disposed at a more forward position than the drive axis Ad, and the rear gear 24 is disposed at a more rearward position than the drive axis Ad. The front gear 23 and the rear gear 24 oppose each other with an interval therebetween in the front-rear direction.

The front gear 23, the rear gear 24, and the dog clutch 25 are disposed on the propeller axis Ap. The intermediate shaft 12 is inserted in the front gear 23, in the rear gear 24, and in the dog clutch 25. The front gear 23, the rear gear 24, and the dog clutch 25 are rotatable around the propeller axis Ap. The front gear 23 is rotationally driven by the drive gear 22 in one direction, and the rear gear 24 is rotationally driven by the drive gear 22 in a direction opposite to that of the front gear 23.

Figure 3:
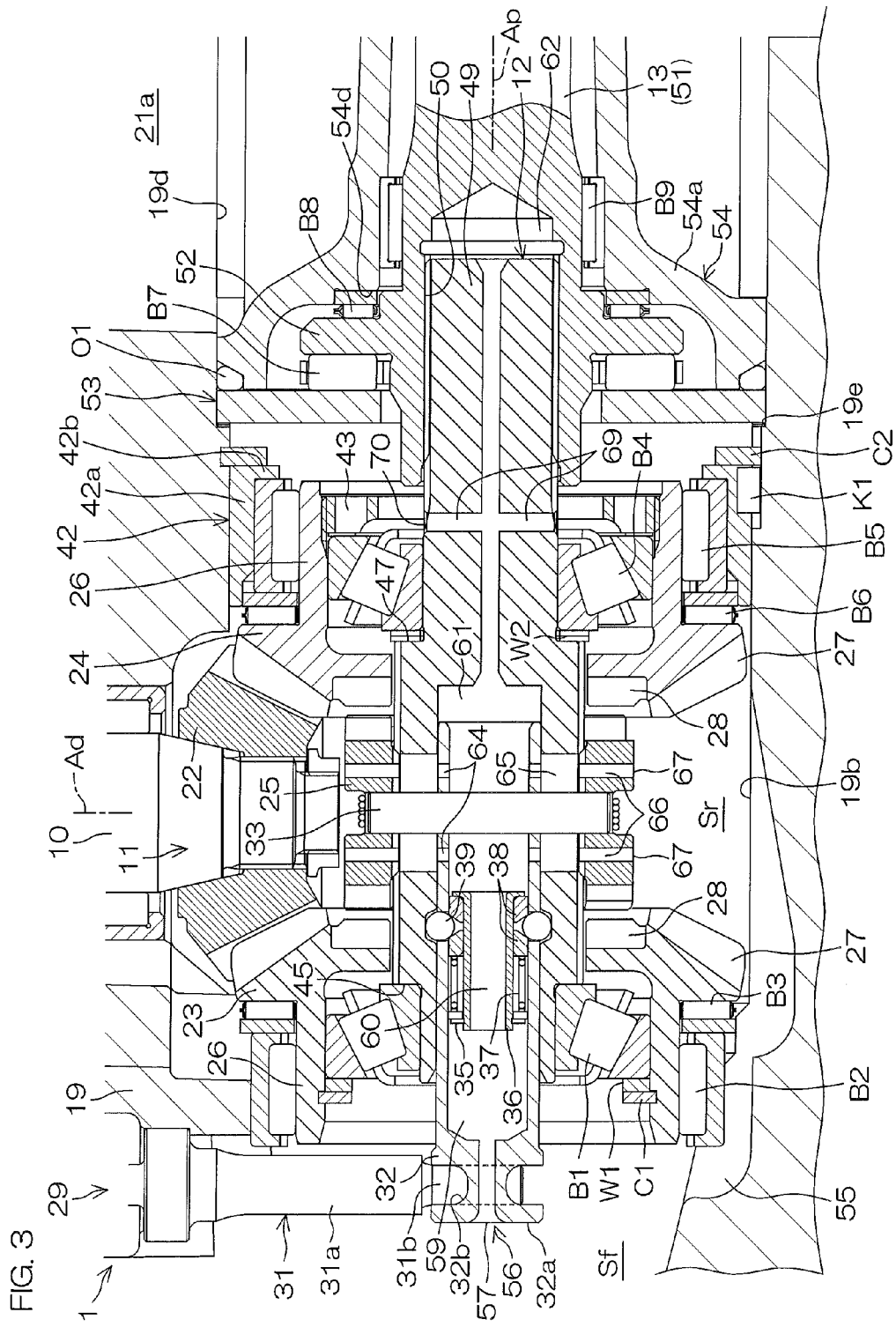
FIG. 3 is an enlarged view of a forward portion of FIG. 2.

As shown in FIG. 3, each of the front and rear gears 23 and 24 includes a cylindrical portion 26 that surrounds the propeller axis Ap, a cylindrical tooth portion 27 that has an outer diameter larger than the cylindrical portion 26, and a cylindrical engagement portion 28 that is disposed inside the tooth portion 27 in the radial direction. The dog clutch 25 is disposed between the two engagement portions 28 of the front and rear gears 23 and 24.

The dog clutch 25 is spline-coupled to the intermediate shaft 12. The dog clutch 25 is configured to move in the axial direction of the intermediate shaft 12 (in the front-rear direction) with respect to the intermediate shaft 12, and is rotatable together with the intermediate shaft 12 around a center line of the intermediate shaft 12 (i.e., around the propeller axis Ap). The dog clutch 25 includes a front engagement portion that opposes the engagement portion 28 of the front gear 23 and a rear engagement portion that opposes the engagement portion 28 of the rear gear 24. The dog clutch 25 is configured to move in the front-rear direction between a normal rotation position at which the front engagement portion engages the engagement portion 28 of the front gear 23 and a reverse rotation position at which the rear engagement portion engages the engagement portion 28 of the rear gear 24.

The outboard motor 3 includes a shift mechanism 29 that switches the shift state of the forward/backward switching mechanism 11 by moving the dog clutch 25 in the front-rear direction.

The shift mechanism 29 puts the dog clutch 25 in any one of the shift positions including the normal rotation position, the reverse rotation position, and the neutral position (shown in FIG. 3). The normal rotation position and the reverse rotation position are engagement positions at which the dog clutch 25 engages either the front gear 23 or the rear gear 24. The neutral position is a position between the normal rotation position and the reverse rotation position, and is a non-engagement position at which the dog clutch 25 engages neither the front gear 23 nor the rear gear 24. The neutral position is a position at which rotation transmission from the front and rear gears 23 and 24 to the dog clutch 25 is cut off.

As shown in FIG. 1, the shift mechanism 29 includes a shift actuator 30 that is driven in accordance with the shift operation of a vessel operator, a shift rod 31 that is rotationally driven by the shift actuator 30, a shift slider 32 that is driven by the shift rod 31 in the front-rear direction, and a connection pin 33 by which the shift slider 32 and the dog clutch 25 are connected together. As shown in FIG. 3, the shift rod 31 includes a rod portion 31a and a pin portion 31b. The pin portion 31b is disposed in an annular groove 32b of the shift slider 32.

As shown in FIG. 3, the shift slider 32 is disposed on the propeller axis Ap. The shift slider 32 is inserted in an intermediate shaft passage 61 disposed in the intermediate shaft 12. The shift slider 32 is slidable in the front-rear direction along the intermediate shaft passage 61. The intermediate shaft passage 61 extends rearwardly from a front end surface of the intermediate shaft 12. The shift slider 32 protrudes forwardly from the front end of the intermediate shaft 12. The front end of the shift slider 32 is disposed at a more forward position than the intermediate shaft 12.

When a vessel operator operates a shift lever (not shown) disposed in the hull H1, the shift actuator 30 turns the shift rod 31 around a center line of the rod portion 31a. The pin portion 31b of the shift rod 31 is eccentric with respect to the rod portion 31a, and thus the pin portion 31b of the shift rod 31 moves in the front-rear direction when the shift rod 31 turns around the center line of the rod portion 31a. As a result, the shift slider 32 is pressed by the pin portion 31b forwardly or rearwardly, and moves in the front-rear direction. Simultaneously, the dog clutch 25 and the connection pin 33 move in the front-rear direction, and, as a result, the dog clutch 25 is placed at any one of the shift positions including the normal rotation position, the reverse rotation position, and the neutral position.

As shown in FIG. 2, the outboard motor 3 includes a positioning mechanism 34 that holds the dog clutch 25 at the neutral position.

As shown in FIG. 3, the positioning mechanism 34 includes a plurality of balls 39 that protrude outwardly in the radial direction from an outer peripheral surface of the shift slider 32, a pair of annular cams 38 that support the balls 39 movably in the radial direction, and a coil spring 37 that supports the balls 39 in the radial direction by urging the pair of annular cams 38 in the axial direction. The positioning mechanism 34 further includes a sleeve 36 surrounded by the pair of annular cams 38 and by the coil spring 37 around the propeller axis Ap and a retaining ring 35 that prevents the annular cams 38 and the coil spring 37 from detaching from the sleeve 36. The sleeve 36 includes a circularly cylindrical portion that extends in the front-rear direction along the propeller axis Ap and an annular portion that extends outwardly in the radial direction from the rear end portion of the cylindrical portion. The front end and the rear end of the cylindrical portion are open.

The front gear 23 is rotatably held by the lower case 19 with a bearing B2 and a bearing B3 therebetween. The bearing B2 and the bearing B3 surround the cylindrical portion 26 of the front gear 23 around the propeller axis Ap. The bearing B3 is disposed between the bearing B2 and the tooth portion 27 of the front gear 23.

The bearing B3 is, for example, a thrust roller bearing. The bearing B2 is, for example, a radial roller bearing. An outer ring of the bearing B2 is prevented from moving forwardly by the lower case 19. The bearing B3 is supported by the outer ring of the bearing B2 from the front. As a result, the front gear 23 is prevented from moving forwardly with respect to the lower case 19.

The rear gear 24 is rotatably held by the lower case 19 with the bearing B5, the bearing B6, and the holder 42 therebetween. The bearing B5 and the bearing B6 surround the cylindrical portion 26 of the rear gear 24 around the propeller axis Ap. The holder 42 surrounds the bearing B5 and the bearing B6 around the propeller axis Ap. The bearing B6 is disposed between the tooth portion 27 of the rear gear 24 and the bearing B5 in the front-rear direction. The bearing B6 is, for example, a thrust roller bearing. The bearing B5 is, for example, a radial roller bearing. The bearing B6 is supported by an outer ring of the bearing B5 from behind. A bearing washer of the bearing B6 and the outer ring of the bearing B5 are held by the holder 42.

A cylindrical portion 42a of the holder 42 surrounds the bearing B5 and the bearing B6 around the propeller axis Ap. The cylindrical portion 42a is prevented from moving in the circumferential direction with respect to the lower case 19 by a key K1 which protrudes from the cylindrical portion 42a outwardly in the radial direction. Additionally, the cylindrical portion 42a is prevented from moving in the radial direction with respect to the lower case 19 by the inner surface 19b of the lower case 19.

An annular portion 42b of the holder 42 extends inwardly from the rear end portion of the cylindrical portion 42a. A circlip C2 is fitted to an attachment groove provided with the lower case 19, and is prevented from moving in the front-rear direction with respect to the lower case 19. The bearing B5 and the bearing B6 are supported by the holder 42 and the circlip C2 from behind.

The outboard motor 3 includes a plurality of bearings (a bearing B1 and a bearing B4) that rotatably hold the intermediate shaft 12 around the propeller axis Ap. The outboard motor 3 further includes a circlip C1 that prevents the bearing B1 from moving forwardly with respect to the front gear 23 and a pressing member 43 that prevents the bearing B4 from moving rearwardly with respect to the rear gear 24. The bearing B1 is an example of a first bearing according to the first preferred embodiment of the present invention. The bearing B4 is an example of a second bearing according to the first preferred embodiment of the present invention.

The intermediate shaft 12 is rotatably held by the front gear 23 and the rear gear 24 with the bearing B1 and the bearing B4 therebetween. The bearing B1 and the circlip C1 are disposed in the cylindrical portion 26 of the front gear 23. The bearing B4 and the pressing member 43 are disposed in the cylindrical portion 26 of the rear gear 24. The circlip C1 is disposed in front of the bearing B1, and the pressing member 43 is disposed behind the bearing B4. The bearing B1 and the circlip C1 surround the intermediate shaft 12 around the propeller axis Ap. Likewise, the bearing B4 and the pressing member 43 surround the intermediate shaft 12 around the propeller axis Ap.

The bearing B1 is, for example, a tapered roller bearing. The bearing B1 includes a cylindrical inner ring that surrounds the intermediate shaft 12 around the propeller axis Ap, a cylindrical outer ring that surrounds the inner ring around the propeller axis Ap, and a plurality of rolling elements that are disposed between the inner ring and the outer ring. The inner ring of the bearing B1 is connected to the intermediate shaft 12, and the outer ring of the bearing B1 is connected to the front gear 23. The rolling elements of the bearing B1 are disposed along a conical surface tapering toward the front.

The outer ring of the bearing B1 is disposed behind the circlip C1. The circlip C1 is fitted to an attachment groove provided with the front gear 23, and is prevented from moving in the front-rear direction with respect to the front gear 23. The circlip C1 may support the outer ring of the bearing B1 with an annular washer W1 shown in FIG. 3 therebetween, or may support the outer ring of the bearing B1 directly.

The inner ring of the bearing B1 is disposed in front of a front annular stepped portion 45 of the intermediate shaft 12. The inner ring of the bearing B1 may support the intermediate shaft 12 with an annular washer therebetween, or may support the intermediate shaft 12 directly. The intermediate shaft 12 is prevented from moving forwardly with respect to the inner ring of the bearing B1 by the front annular stepped portion 45. When the intermediate shaft 12 is pressed forwardly, a force that forwardly presses the intermediate shaft 12 is transmitted from the front annular stepped portion 45 to the inner ring of the bearing B1, and the inner ring of the bearing B1 is pressed forwardly.

The bearing B4 is, for example, a tapered roller bearing. The bearing B4 includes a cylindrical inner ring that surrounds the intermediate shaft 12 around the propeller axis Ap, a cylindrical outer ring that surrounds the inner ring around the propeller axis Ap, and a plurality of rolling elements disposed between the inner ring and the outer ring. The inner ring of the bearing B4 is connected to the intermediate shaft 12, and the outer ring of the bearing B4 is connected to the rear gear 24. The rolling elements of the bearing B4 are disposed along a conical surface tapering toward the rear.

The outer ring of the bearing B4 is disposed in front of the pressing member 43. The pressing member 43 is screwed to the rear gear 24, and is prevented from moving in the front-rear direction with respect to the rear gear 24. The pressing member 43 may support the outer ring of the bearing B4 with an annular washer therebetween, or may support the outer ring of the bearing B4 directly.

The inner ring of the bearing B4 is disposed behind a rear annular stepped portion 47 of the intermediate shaft 12. The inner ring of the bearing B4 may support the intermediate shaft 12 with an annular washer W2 shown in FIG. 3 therebetween, or may support the intermediate shaft 12 directly. The intermediate shaft 12 is prevented from moving rearwardly with respect to the inner ring of the bearing B4 by the rear annular stepped portion 47. When the inner ring of the bearing B4 is pressed forwardly, a force that forwardly presses the inner ring of the bearing B4 is transmitted from the rear annular stepped portion 47 to the intermediate shaft 12, and the intermediate shaft 12 is pressed forwardly.

The pressing member 43 includes a male screw portion disposed at the outer peripheral portion of the pressing member 43. The male screw portion of the pressing member 43 is attached to a female screw portion disposed at the inner peripheral portion of the cylindrical portion 26 of the rear gear 24. As a result, the pressing member 43 is screwed to the rear gear 24. The pressing member 43 presses the outer ring of the bearing B4 forwardly. The pressing member 43 is screwed to the rear gear 24, and, as a result, a force is generated by which the bearing B4 and the intermediate shaft 12 are moved forwardly and by which the rear gear 24 is moved rearwardly. As a result, the bearing B4 is preloaded, and the bearing B4 is in a state in which its inner gap has been removed. Furthermore, a force (preload) with which the pressing member 43 forwardly presses the outer ring of the bearing B4 is transmitted to the inner ring of the bearing B1 through the bearing B4 and the intermediate shaft 12. Additionally, this force (preload) is transmitted to the bearing B2 and the bearing B3 through the circlip C1 and the front gear 23. Therefore, the inner gap of the bearing B1, that of the bearing B2, and that of the bearing B3 are removed.

The inner gap of the bearing B1 and that of the bearing B4 are removed by the preload applied from the pressing member 43 in this manner, and thus the position of the front gear 23 and that of the rear gear 24 in the axial direction and in the radial direction are fixed. In other words, the front gear 23 and the rear gear 24 are held such that the front gear 23 and the rear gear 24 do not perform any operations, such as inclination, other than rotation. Therefore, the engagement between the drive gear 22 and each gear (i.e., each of the front and rear gears 23 and 24) is prevented from being destabilized. As a result, the durability of the gear is prevented from being lowered. Therefore, it is possible to use the vessel propulsion apparatus 1 both according to the normal rotation specifications and according to the reverse rotation specifications. Other effects and the like brought about by preloading are described in U.S. Pat. No. 8,616,929, the entire disclosure of which patent is hereby incorporated herein by reference.

The intermediate shaft 12 includes a front attachment portion surrounded by the bearing B1, a clutch attachment portion surrounded by the dog clutch 25, a rear attachment portion surrounded by the bearing B4, and a spline shaft portion 49 extending in the front-rear direction. The front annular stepped portion 45 and the rear annular stepped portion 47 discussed above are disposed at the front end surface and the rear end surface of the clutch attachment portion, respectively.

The outer diameter of the clutch attachment portion of the intermediate shaft 12 is greater than the outer diameter of the front attachment portion, greater than that of the rear attachment portion, and greater than that of the spline shaft portion 49. The front attachment portion extends forwardly from the clutch attachment portion. The rear attachment portion extends rearwardly from the clutch attachment portion. The spline shaft portion 49 extends rearwardly from the rear attachment portion. The rear end of the spline shaft portion 49 is disposed at a more rearward position than the rear gear 24. The front attachment portion, the clutch attachment portion, the rear attachment portion, and the spline shaft portion 49 are disposed on the propeller axis Ap. The shift slider 32 is inserted in the front attachment portion and in the clutch attachment portion.

As shown in FIG. 2, the propeller shaft 13 includes a shaft portion 51 disposed on the propeller axis Ap and an annular flange portion 52 that extends from the shaft portion 51 outwardly in the radial direction.

The rear end portion of the shaft portion 51 protrudes rearwardly from the torpedo portion 19a of the lower case 19. The propeller 14 is detachably attached to the rear end portion of the shaft portion 51. The spline shaft portion 49 of the intermediate shaft 12 is inserted in the shaft portion 51 from in front of the propeller shaft 13. The shaft portion 51 includes a spline hole 50 in which the spline shaft portion 49 is inserted. The spline hole 50 extends rearwardly from the front end surface of the shaft portion 51, and is open at the front end surface of the shaft portion 51.

The propeller shaft 13 is joined to the intermediate shaft 12 by the spline shaft portion 49 of the intermediate shaft 12 and by the spline hole 50 of the propeller shaft 13. Therefore, the propeller shaft 13 is movable in the axial direction of the spline shaft portion 49 (i.e., in the front-rear direction) with respect to the intermediate shaft 12, and is rotatable together with the intermediate shaft 12 around a center line of the spline shaft portion 49.

The flange portion 52 of the propeller shaft 13 is disposed behind the rear gear 24. The flange portion 52 is attached such that the rear end of the intermediate shaft 12 (i.e., the rear end of the spline shaft portion 49) is positioned at a more forward position than the rear end of the spline hole 50 provided with the propeller shaft 13 in a state in which the propeller shaft 13 has been attached to the inside of the lower case 19. As a result, a thrust applied onto the propeller shaft 13 is mainly transmitted to the lowercase 19 through the flange portion 52, and thus a thrust that is transmitted to the intermediate shaft 12 is cut off or reduced. The flange portion 52 surrounds the spline shaft portion 49 of the intermediate shaft 12 around the propeller axis Ap.

Figure 4:
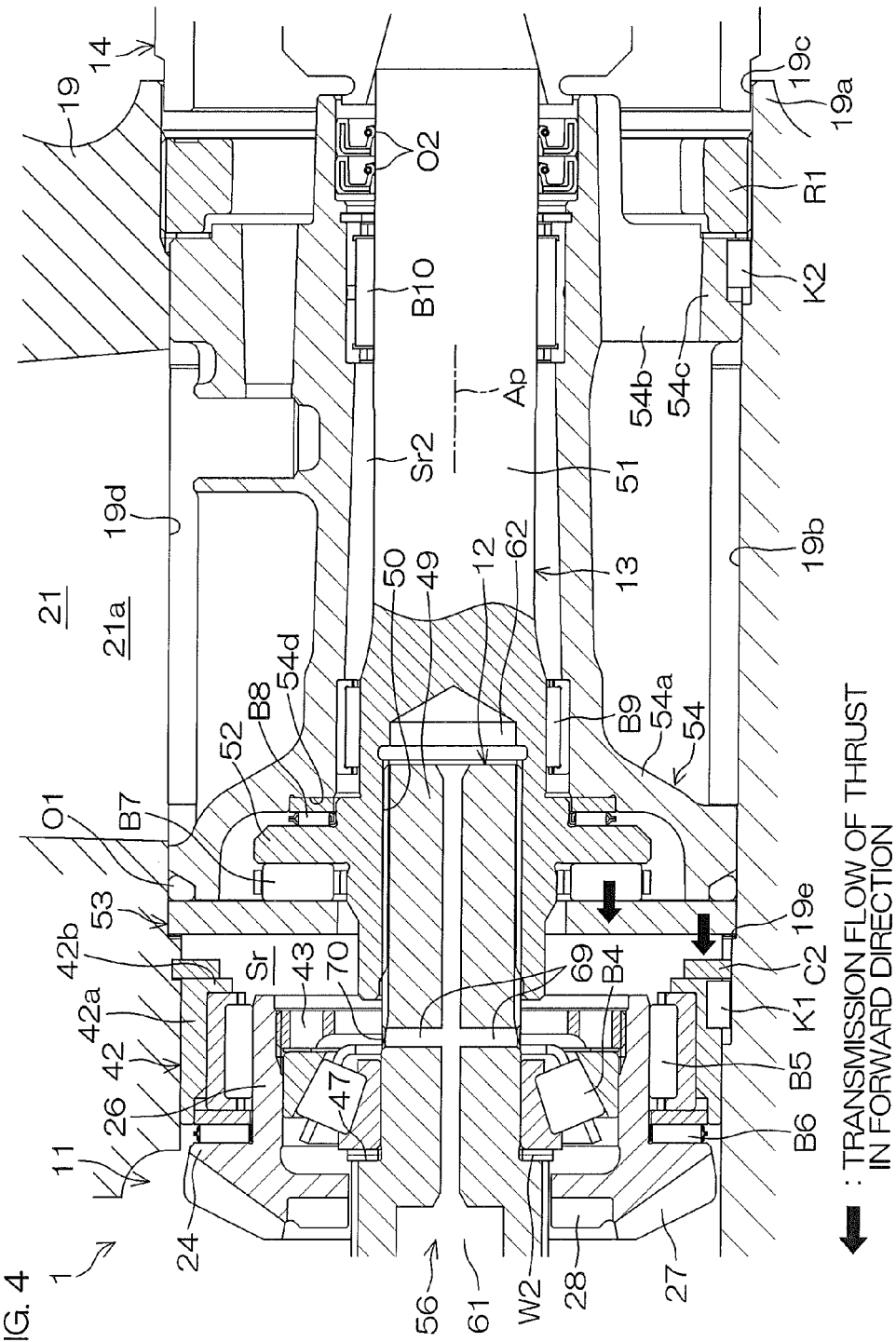
FIG. 4 is an enlarged view of a rearward portion of FIG. 2.

As shown in FIG. 4, the outboard motor 3 includes a plurality of bearings (bearing B7, bearing B8, bearing B9, and bearing B10) that rotatably hold the propeller shaft 13 around the propeller axis Ap. The outboard motor 3 further includes a cylindrical housing 54 that surrounds the propeller shaft 13 around the propeller axis Ap, an annular lid 53 that is disposed in front of the housing 54, and an annular fastening ring R1 that fastens the housing 54 and the lid 53 to the lower case 19.

Thrust transmitting members according to the first preferred embodiment of the present invention include the lid 53, the housing 54, and the bearings B7 and B8. Fixed members according to the first preferred embodiment of the present invention include the lid 53 and the housing 54. The bearing B7 is an example of a front bearing according to the first preferred embodiment of the present invention. The bearing B8 is an example of a rear bearing according to the first preferred embodiment of the present invention.

As shown in FIG. 4, the propeller shaft 13 is inserted in the housing 54 and the lid 53. The housing 54 and the lid 53 are fastened to the lower case 19 in the front-rear direction by the fastening ring R1. Additionally, the housing 54 is prevented from moving in the circumferential direction with respect to the lower case 19 by a key K2 which protrudes from an outer cylinder portion 54c of the housing 54 outwardly in the radial direction.

The bearings B7 to B10 are spaced in the front-rear direction in this order from the front. Each of the bearings B7 to B10 surrounds the shaft portion 51 of the propeller shaft 13 around the propeller axis Ap. The bearing B7 is disposed in front of the flange portion 52 of the propeller shaft 13, and the bearing B8 is disposed behind the flange portion 52. The lid 53 is disposed in front of the bearing B7. The flange portion 52 is prevented from moving in the front-rear direction with respect to the lower case 19 by the bearing B7, the bearing B8, the lid 53, and the housing 54. The bearing B7 is, for example, a thrust roller bearing. Likewise, the bearing B8 is, for example, a thrust roller bearing. The bearing B9 is, for example, a radial roller bearing. Likewise, the bearing B10 is, for example, a radial roller bearing. The shaft portion 51 is prevented from moving in the radial direction with respect to the lower case 19 by the bearing B9, the bearing B10, and the housing 54.

The housing 54 includes an inner cylinder portion 54a that surrounds the shaft portion 51 of the propeller shaft 13 around the propeller axis Ap, an outer cylinder portion 54c that surrounds the rear end portion of the inner cylinder portion 54a around the propeller axis Ap with an interval in the radial direction, and a plurality of (e.g., three) rib portions 54b by which the inner cylinder portion 54a and the outer cylinder portion 54c are connected together at a plurality of positions spaced in the circumferential direction.

The main exhaust passage 21 of the outboard motor 3 includes a lower guide portion 21a that guides exhaust gases downwardly toward the housing 54. The lower guide portion 21a is disposed above an exhaust passage opening 19d that is open at the inner surface 19b of the lower case 19. Exhaust gases flowing downwardly in the lower guide portion 21a pass through the exhaust passage opening 19d, and then flow rearwardly along the outer peripheral surface of the inner cylinder portion 54a, and passes between the outer peripheral surface of the inner cylinder portion 54a and the inner peripheral surface of the outer cylinder portion 54c. Thereafter, the exhaust gases pass through the inside of the propeller 14, and are discharged rearwardly from the propeller 14 (i.e., from the main exhaust port 20).

The lid 53 is disposed behind an annular forward stepped portion 19e included in the inner surface 19b of the lower case 19. The front end portion of the housing 54 is supported from the front by the forward stepped portion 19e of the lower case 19 with the lid 53 therebetween. The space between the housing 54 and the inner surface 19b is sealed with an O-ring O1 that surrounds the housing 54. The O-ring O1 is disposed behind the lid 53. The housing 54 and the lid 53 are sandwiched between the fastening ring R1 and the forward stepped portion 19e of the lower case 19 in the front-rear direction. As a result, the housing 54 and the lid 53 are fixed to the lower case 19.

Next, the transmission of a thrust from the propeller 14 to the lower case 19 will be described.

A thrust in the forward direction generated by causing the propeller 14 to normally rotate is transmitted to the flange portion 52 of the propeller shaft 13 through the shaft portion 51 of the propeller shaft 13. As shown by black arrows in FIG. 4, the forward-direction thrust transmitted to the flange portion 52 is transmitted to the inner peripheral portion of the lid 53, which is an example of a front supporting portion, through the bearing B7. Thereafter, the forward-direction thrust transmitted to the lid 53 is transmitted to the forward stepped portion 19e of the lower case 19 through the outer peripheral portion of the lid 53. As a result, the forward-direction thrust is transmitted from the vessel propulsion apparatus 1 to the hull H1, and the hull H1 is propelled forwardly.

On the other hand, a thrust in the backward direction generated by causing the propeller 14 to reversely rotate is transmitted to the flange portion 52 of the propeller shaft 13 through the shaft portion 51 of the propeller shaft 13. The backward-direction thrust transmitted to the flange portion 52 is transmitted to a rear supporting portion 54d of the housing 54 through the bearing B8. Thereafter, the backward-direction thrust transmitted to the housing 54 is transmitted to the lowercase 19 through the fastening ring R1 disposed behind the housing 54. As a result, the backward-direction thrust is transmitted from the vessel propulsion apparatus 1 to the hull H1, and the hull H1 is propelled backwardly.

As shown in FIG. 3, the propeller shaft 13 is spline-coupled to the intermediate shaft 12 by the spline hole 50 and the spline shaft portion 49 extending in the front-rear direction. Therefore, the transmission of the forward-direction thrust from the propeller shaft 13 to the intermediate shaft 12 is cut off. Likewise, the transmission of the backward-direction thrust from the propeller shaft 13 to the intermediate shaft 12 is cut off. Therefore, the forward-direction thrust and the backward-direction thrust are applied neither to the bearings B1 and B4 supporting the intermediate shaft 12 nor to the front and rear gears 23 and 24 supporting the bearings B1 and B4.

Next, a lubricating system of the vessel propulsion apparatus 1 will be described.

As shown in FIG. 2, the lower case 19 defines an oil containing space in which lubricating oil is contained. The oil containing space includes a forward space Sf in front of the front gear 23 and a rearward space Sr behind the front gear 23. The rearward space Sr includes a space Sr1 between the front gear 23 and the rear gear 24 in the front-rear direction and a space Sr2 behind the rear gear 24.

The oil containing space of the lower case 19 contains movable members, such as the front gear 23 and the rear gear 24, that are movable with respect to the lower case 19. The movable members are contained in the lower case 19, and define members that are movable with respect to the lower case 19. The movable members include the drive gear 22, the front gear 23, the rear gear 24, the dog clutch 25, the sleeve 36, the intermediate shaft 12, the propeller shaft 13, the bearings, etc.

The outboard motor 3 includes an oil groove 55, which passes around the front gear 23 and which extends from the forward space Sf in front of the front gear 23 to the rearward space Sr behind the front gear 23, and an oil passage 56, which passes through the inside of the front gear 23 and which extends from the forward space Sf in front of the front gear 23 to the rearward space Sr behind the front gear 23.

The oil groove 55 is defined by the inner surface of the lower case 19. The oil groove 55 is open at the inner surface 19b of the lower case 19. The front end of the oil groove 55 is disposed at a more forward position than the front gear 23. The rear end of the oil groove 55 is disposed at a more rearward position than the front gear 23. The oil groove 55 is disposed below the front gear 23. The oil groove 55 passes around the bearings B2 and B3 and extends from in front of the front gear 23 to behind the front gear 23.

As shown in FIG. 3, the oil passage 56 is defined by a plurality of members including the shift slider 32. The oil passage 56 includes main passages 59 to 62 that pass through the inside of the front gear 23 and extend from the forward space Sf in front of the front gear 23 to the rearward space Sr behind the front gear 23 and a plurality of branch passages 64 to 67, 69, and 70 that diverge from the main passages. The main passages include an oil inlet 57 disposed in front of the front gear 23. The branch passages include a plurality of oil outlets 67 and 70 disposed at more rearward positions, respectively, than the front gear 23. The main passages extend rearwardly from the oil inlet 57. The branch passages extend from the main passages to the oil outlets, respectively.

The branch passages include the first branch passages 64 to 67 disposed between the front gear 23 and the rear gear 24 and the second branch passages 69 and 70 disposed at more rearward positions, respectively, than the dog clutch 25. The oil outlets include the first oil outlet 67 disposed between the front gear 23 and the rear gear 24 and the second oil outlet 70 disposed at a more rearward position than the dog clutch 25. The first oil outlet 67 is a portion of the first branch passage, and the second oil outlet 70 is a portion of the second branch passage. Each branch passage is disposed at a more rearward position than the front gear 23.

The first branch passages 64 to 67 extend outwardly in the radial direction from the main passage. The first branch passage passes through the shift slider 32, the intermediate shaft 12, and the dog clutch 25 in the radial direction. The first branch passage extends from the inner periphery of the dog clutch 25 to the outer periphery of the dog clutch 25. The outer end of the first branch passage is open at the outer peripheral surface of the dog clutch 25. The inner end of the first branch passage is open at the inner peripheral surface of the shift slider 32. The position of the inner end of the first branch passage corresponds to a first branch position at which the first branch passage diverges from the main passage.

The second branch passages 69 and 70 extend outwardly in the radial direction from the main passage. The second branch passage passes through the intermediate shaft 12 in the radial direction. The outer end of the second branch passage is open at the outer peripheral surface of the intermediate shaft 12. The inner end of the second branch passage is open at the inner peripheral surface of the intermediate shaft 12. The position of the inner end of the second branch passage corresponds to a second branch position at which the second branch passage diverges from the main passage. The second branch passage is disposed at a more forward position than the propeller shaft 13 and at a more rearward position than the inner ring of the bearing B4. The second branch passage is disposed in the rear gear 24.

Oil in the lower case 19 is preferably guided by the oil passage 56 as follows, for example.

As shown in FIG. 3, oil in the lower case 19 flows into the main passage (i.e., into the slider passage 59) from the oil inlet 57 that is open at the front end surface 32a of the shift slider 32. The oil that has flowed into the main passage flows rearwardly in the main passage. As a result, the oil passes through the inside of the front gear 23, and flows from the forward space Sf in front of the front gear 23 to the rearward space Sr behind the front gear 23. Thereafter, the oil that has passed through the inside of the front gear 23 is supplied from the main passage to the branch passages.

The oil that has reached a connection position between the main passage and the first branch passage flows from the main passage into the first branch passage (i.e., first slider hole 64).

The oil that has flowed into the first branch passage passes through the shift slider 32, the intermediate shaft 12, and the dog clutch 25 in the radial direction, and is then discharged to the periphery of the dog clutch 25 from the first oil outlet 67 disposed between the front gear 23 and the rear gear 24. As a result, the members, such as the drive gear 22, the front gear 23, and the rear gear 24, that are disposed near the first oil outlet 67 are lubricated.

The oil that has reached a connection position between the main passage and the second branch passage flows from the main passage into the second branch passage (i.e., second intermediate shaft hole 69). The oil that has flowed into the second branch passage passes through the intermediate shaft 12 in the radial direction, and is then discharged to the periphery of the intermediate shaft 12 from the second oil outlet 70 disposed at a more rearward position than the dog clutch 25. As a result, the members, such as the bearing B4, the bearing B5, and the bearing B6, that are disposed near the second oil outlet 70 are lubricated.

The oil in the main passage that has passed through the second branch passage flows into the propeller shaft passage 62 of the main passage from the intermediate shaft passage 61 of the main passage. The oil that has flowed into the propeller shaft passage 62 flows forwardly between the outer periphery of the spline shaft portion 49 of the intermediate shaft 12 and the inner periphery of the spline hole 50 of the propeller shaft 13, and is discharged forwardly from the front end of the shaft portion 51 of the propeller shaft 13. As a result, the oil is supplied to the spline shaft portion 49 and to the spline hole 50, so that the spline shaft portion 49 and the spline hole 50 are lubricated.

Next, a non-limiting example of a method for manufacturing the vessel propulsion apparatus 1 will be described.

As shown in FIG. 5A to FIG. 5F, each member disposed in the torpedo portion 19a of the lower case 19 is inserted into the lower case 19 from a case opening 19c provided with the rear end of the torpedo portion 19a.

Figure 5A:
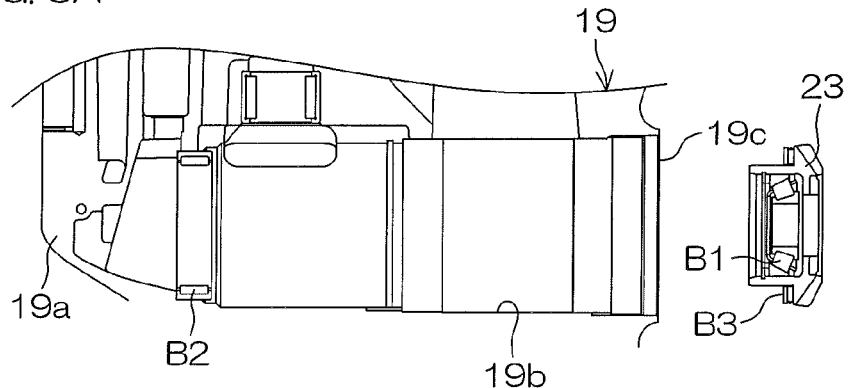
FIG. 5A is a view showing a manufacturing process step of the vessel propulsion apparatus.

First, as shown in FIG. 5A, the bearing B2 is inserted into the lower case 19. Thereafter, the front gear 23, the bearing B1, and the bearing B3 are inserted into the lower case 19.

Figure 5B:
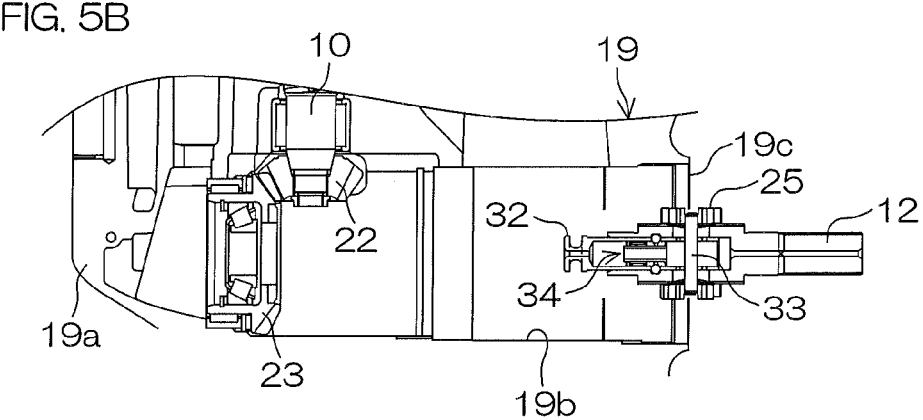
FIG. 5B is a view showing a manufacturing process step of the vessel propulsion apparatus.

Thereafter, as shown in FIG. 5B, the drive shaft 10 is inserted into the lower case 19 from above the lower case 19, and is fixed in a state in which the drive gear 22 has engaged the front gear 23. Thereafter, the intermediate shaft 12, the shift slider 32, the positioning mechanism 34, the connection pin 33, and the dog clutch 25 are inserted into the lower case 19.

Figure 5C:
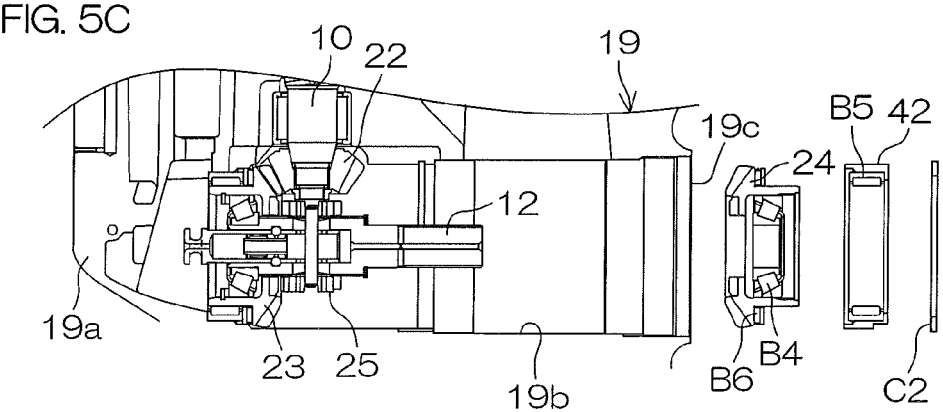
FIG. 5C is a view showing a manufacturing process step of the vessel propulsion apparatus.

Thereafter, as shown in FIG. 5C, the rear gear 24, the bearing B4, and the bearing B6 are inserted into the lower case 19. Thereafter, the bearing B5 and the holder 42 are inserted into the lower case 19. The bearing B5 and the holder 42 are disposed in predetermined positions, respectively, with respect to the lower case 19, and then the circlip C2 is inserted into the lower case 19.

Figure 5D:
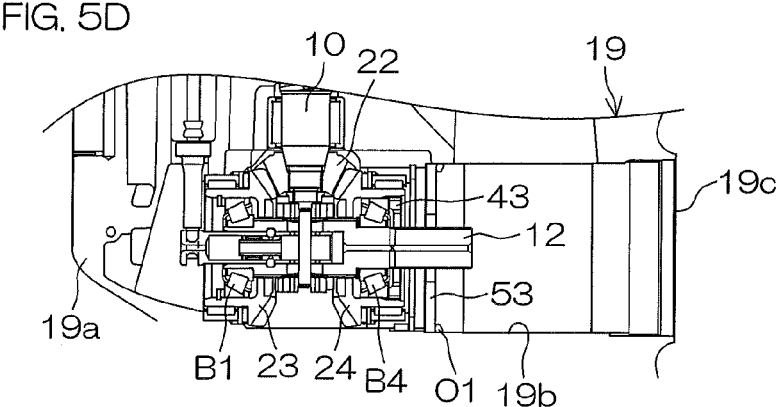
FIG. 5D is a view showing a manufacturing process step of the vessel propulsion apparatus.

Thereafter, as shown in FIG. 5D, the pressing member 43 is inserted into the lower case 19, and is disposed in a predetermined position with respect to the lower case 19. As a result, an inner gap of the bearing B1 and that of the bearing B4 are removed by a preload applied from the pressing member 43. The preload from the pressing member 43 is applied onto the bearing B1 and the bearing B4, and then the lid 53 and the O-ring O1 are inserted into the lower case 19.

Figure 5E:
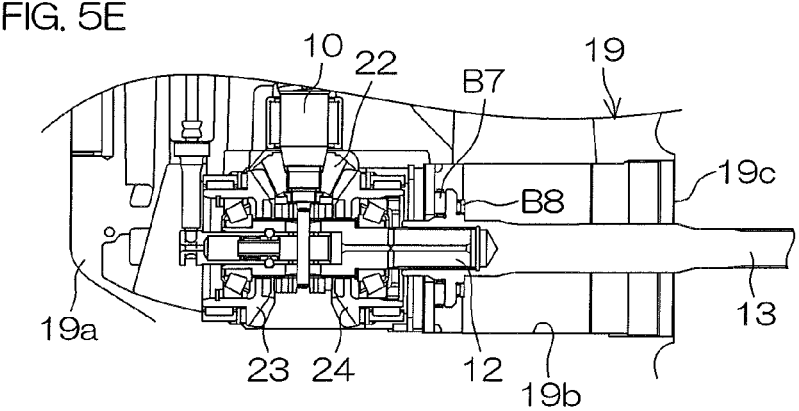
FIG. 5E is a view showing a manufacturing process step of the vessel propulsion apparatus.

Thereafter, as shown in FIG. 5E, the propeller shaft 13, the bearing B7, and the bearing B8 are inserted into the lower case 19. As a result, the propeller shaft 13 is spline-coupled to the intermediate shaft 12.

Figure 5F:
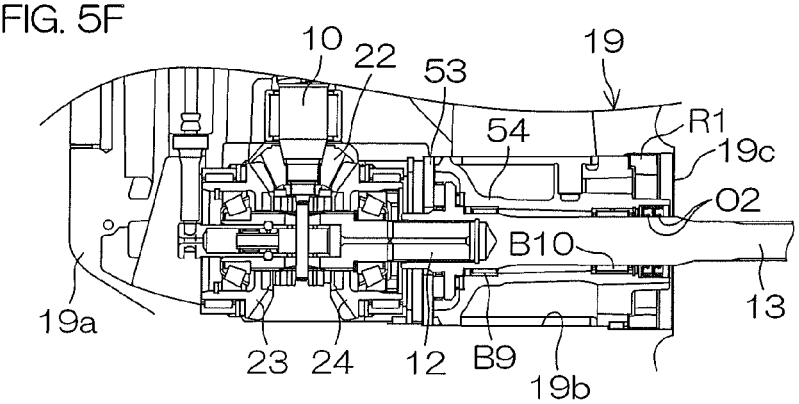
FIG. 5F is a view showing a manufacturing process step of the vessel propulsion apparatus.

Thereafter, as shown in FIG. 5F, the housing 54, the bearing B9, the bearing B10, and the oil seal O2 are inserted into the lower case 19. Thereafter, the fastening ring R1 is inserted into the lower case 19, and is attached to the lower case 19. As a result, the housing 54 is forwardly pressed by the fastening ring R1, and then the lid 53 and the housing 54 are fixed to the lower case 19. Thereafter, the propeller 14 is attached to the rear end portion of the propeller shaft 13.

As described above, in the first preferred embodiment, the oil passage 56 extends from the forward space Sf to the rearward space Sr. Therefore, oil is guided by the oil passage 56 from the forward space Sf to the rearward space Sr. Therefore, oil is supplied into the oil passage 56 more reliably than in an example in which oil flows into the oil passage 56 from the space between the front gear 23 and the rear gear 24 in which the dog clutch 25 and the like are disposed. As a result, a decrease in the supply flow rate of oil with respect to the movable members disposed at more rearward positions than the front gear 23 is prevented.

Additionally, in the first preferred embodiment, the propeller shaft 13 is spline-coupled to the intermediate shaft 12 by the spline shaft portion 49 and the spline hole 50 that engage each other. A thrust transmitted to the propeller shaft 13 is mainly transmitted to the lower case 19 through the flange portion 52 when the propeller 14 generates a forward-direction thrust and a backward-direction thrust, and thus a thrust that is transmitted to the intermediate shaft 12 is cut off or reduced. Therefore, a force that is applied to the front and rear gears 23 and 24 is smaller than in an example in which all thrust is transmitted to the intermediate shaft 12. Therefore, a load applied onto the thrust bearing B3 supporting the front gear 23 is reduced.

Additionally, in the first preferred embodiment, the drive gear 22, the front gear 23, the rear gear 24, the dog clutch 25, and the intermediate shaft 12 are inserted into the lower case 19. Thereafter, the propeller shaft 13, the lid 53, the housing 54, and the bearings B7 to B10 are incorporated into the lower case 19. Thus, the vessel propulsion apparatus 1 is manufactured. Therefore, when the vessel is propelled forwardly, a force applied to at least one of the front and rear gears 23 and 24 is reduced, and the durability of the front and rear gears 23 and 24 is prevented from being lowered.

Second Preferred Embodiment

Figure 6:
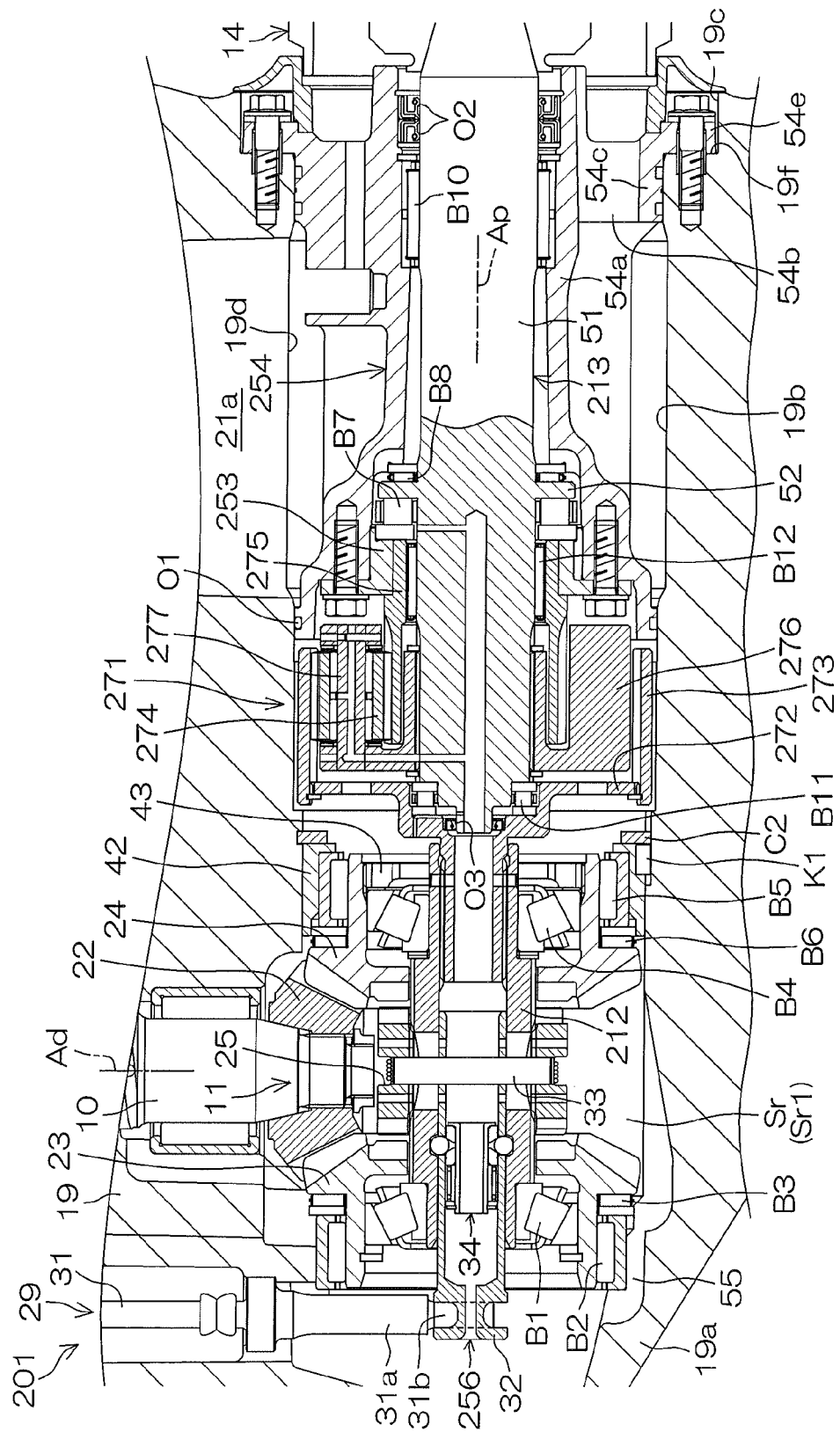
FIG. 6 is a cross-sectional view showing the inside of a lower unit of an outboard motor according to a second preferred embodiment of the present invention.
Figure 7:
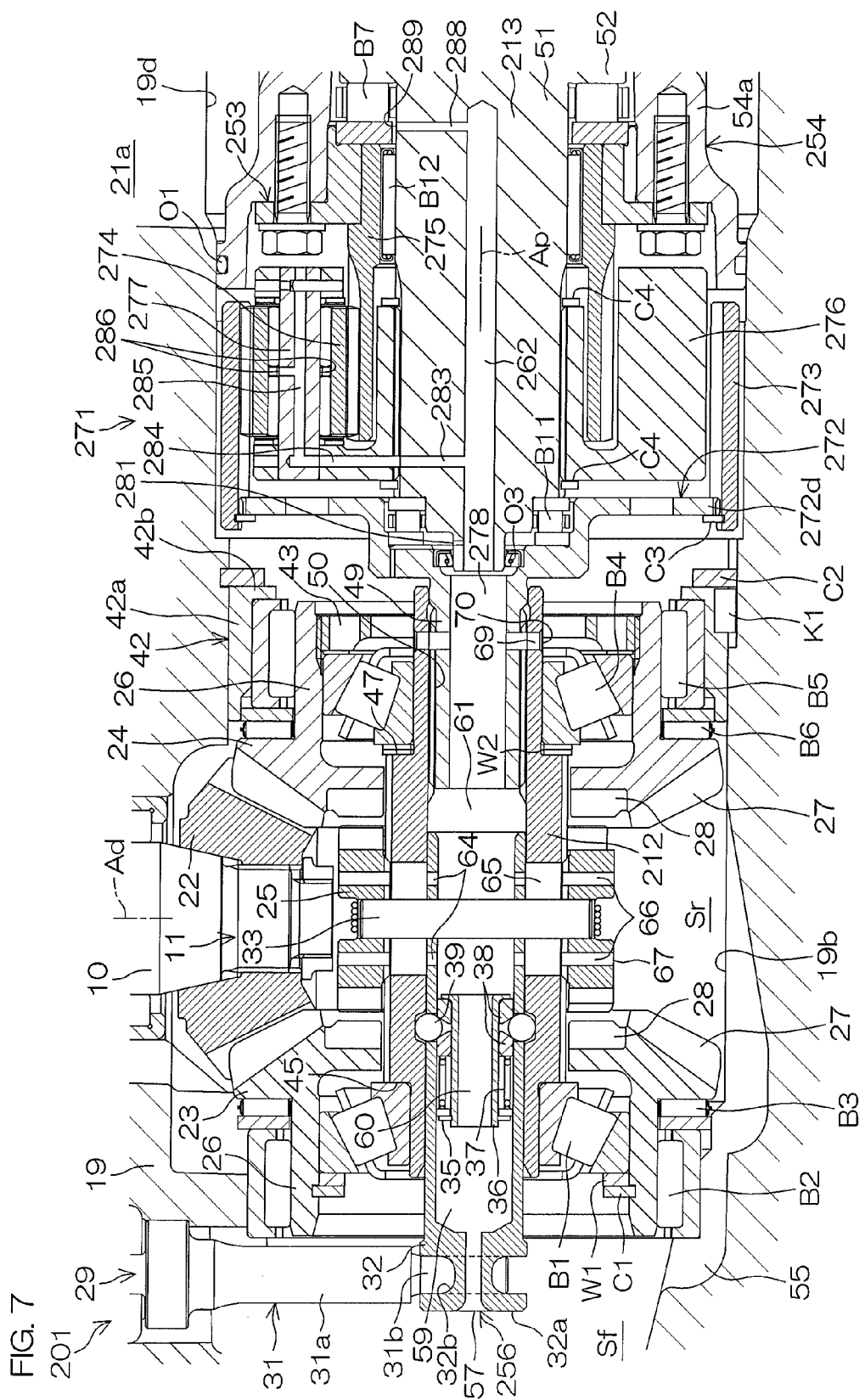
FIG. 7 is an enlarged view of a forward portion of FIG. 6.
Figure 8:
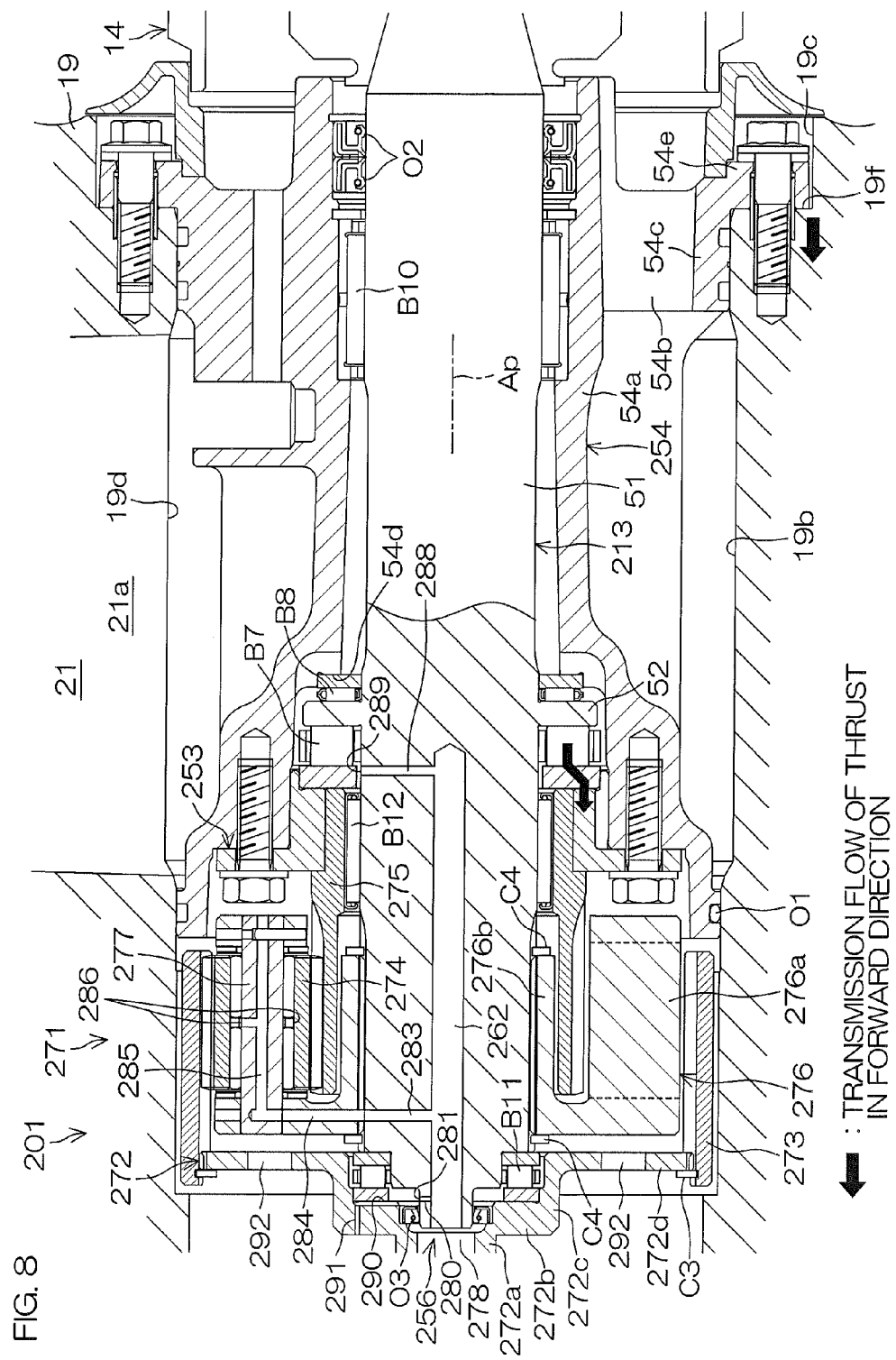
FIG. 8 is an enlarged view of a rearward portion of FIG. 6.

Next, a second preferred embodiment of the present invention will be described. In FIG. 6 to FIG. 8 mentioned below, the same reference sign as in FIG. 1 to FIG. 5F is given to a component equivalent to each component shown in FIG. 1 to FIG. 5F, and a description of the component is omitted.

A main difference between a vessel propulsion apparatus 201 according to the second preferred embodiment and the vessel propulsion apparatus 1 according to the first preferred embodiment is that the vessel propulsion apparatus 201 according to the second preferred embodiment further includes a planetary gear mechanism 271.

Thrust transmitting members according to the second preferred embodiment of the present invention include a lid 253, a housing 254 and bearings B7 and B8. Fixed members according to the second preferred embodiment of the present invention include the lid 253 and the housing 254. The bearing B7 is an example of a front bearing according to the second preferred embodiment of the present invention. The bearing B8 is an example of a rear bearing according to the second preferred embodiment of the present invention.

As shown in FIG. 6, the planetary gear mechanism 271 is disposed in a torpedo portion 19a of a lower case 19. The planetary gear mechanism 271 is disposed behind a forward/backward switching mechanism 11. The planetary gear mechanism 271 is disposed on a propeller axis Ap. The planetary gear mechanism 271 surrounds a propeller shaft 213 around the propeller axis Ap. The planetary gear mechanism 271 connects the forward/backward switching mechanism 11 and the propeller shaft 213 together. The planetary gear mechanism 271 decelerates the rotation of the intermediate shaft 212, and the resulting decelerated rotation is transmitted to the propeller 14.

The planetary gear mechanism 271 includes a rotational shaft 272 that rotates together with the intermediate shaft 212, a ring gear 273 that rotates together with the rotational shaft 272, a plurality of planet gears 274 that are disposed inside the ring gear 273 in the radial direction, a sun gear 275 that is disposed inside the planet gears 274 in the radial direction, and a carrier 276 that rotatably holds the planet gears 274. The sun gear 275 is fixed to the periphery of the propeller axis Ap with respect to the lower case 19. The rotational shaft 272, the planet gear 274, the ring gear 273, and the carrier 276 are rotatable with respect to the lower case 19.

As shown in FIG. 8, the rotational shaft 272 includes a cylindrical first portion 272a that extends in the front-rear direction along the propeller axis Ap, an annular second portion 272b that extends outwardly in the radial direction from the rear end portion of the first portion 272a, a cylindrical third portion 272c that extends rearwardly from the outer peripheral portion of the second portion 272b, and an annular fourth portion 272d that extends outwardly in the radial direction from the rear end portion of the third portion 272c. The space between an inner peripheral surface of the second portion 272b and an outer peripheral surface of the propeller shaft 213 is sealed up with an annular oil seal O3. The carrier 276 includes a cylindrical holding portion 276a that holds the plurality of planet gears 274 and a cylindrical connection portion 276b spline-coupled to the propeller shaft 213. The connection portion 276b is prevented from moving in the front-rear direction with respect to the propeller shaft 213 by two circlips C4.

Next, a lubricating system of the vessel propulsion apparatus 201 will be described.

As shown in FIG. 7, a main passage of an oil passage 256 includes a slider passage 59, a sleeve passage 60, and an intermediate shaft passage 61. The main passage further includes a rotational shaft passage 278 that passes through the rotational shaft 272 in the front-rear direction and a propeller shaft passage 262 that extends rearwardly from the front end surface of the propeller shaft 213 along the propeller axis Ap. The rotational shaft passage 278 is disposed in the intermediate shaft passage 61.

A plurality of branch passages of the oil passage 256 include a plurality of first branch passages 64 to 67 and a plurality of second branch passages 69 and 70. As shown in FIG. 8, the branch passages further include a plurality of third branch passages 280 and 281 disposed at more rearward positions, respectively, than the rear end of the intermediate shaft 212, a plurality of fourth branch passages 283 to 286 disposed at more rearward positions, respectively, than the third branch passages, and a plurality of fifth branch passages 288 and 289 disposed at more rearward positions, respectively, than the fourth branch passages. A plurality of oil outlets include a third oil outlet 281 disposed at a more rearward position than the rear end of the intermediate shaft 212, a fourth oil outlet 286 disposed at a more rearward position than the third oil outlet 281, and a fifth oil outlet 289 disposed at a more rearward position than the fourth oil outlet 286, in addition to the first oil outlet 67 and the second oil outlet 70.

Oil in the lower case 19 is preferably guided by the oil passage 256 as follows, for example.

As shown in FIG. 7, oil in the lower case 19 flows into the main passage (i.e., into the slider passage 59) from the oil inlet 57 that is open at the front end surface 32a of the shift slider 32. The oil that has flowed into the main passage flows rearwardly in the main passage. As a result, the oil passes through the inside of the front gear 23, and flows from the forward space Sf in front of the front gear 23 to the rearward space Sr behind the front gear 23. Thereafter, the oil that has passed through the inside of the front gear 23 is supplied from the main passage to the branch passages.

As shown in FIG. 8, the oil that has reached a connection position between the main passage and the third branch passage flows from the main passage into the third branch passage (i.e., third propeller shaft hole 280). The oil that has flowed into the third branch passage passes through the propeller shaft 213 in the radial direction, and is then discharged to the periphery of the propeller shaft 213 from the third oil outlet 281 disposed inside the bearing B11 in the radial direction. As a result, the members, such as the bearing B11, that are disposed near the third oil outlet 281 are lubricated. Furthermore, a portion of the oil discharged from the third oil outlet 281 passes through a third discharging groove 290 and a third discharging hole 291 that are disposed in the rotational shaft 272, and is discharged to the front of the rotational shaft 272.

The oil that has reached a connection position between the main passage and the fourth branch passage flows from the main passage into the fourth branch passage (i.e., fourth propeller shaft hole 283). The oil that has flowed into the fourth branch passage passes through the propeller shaft 213, the carrier 276, and a center pin 277, and is then discharged to the periphery of the center pin 277 from the fourth oil outlet 286 that is open at the outer peripheral surface of the center pin 277. As a result, the members, such as the planet gear 274 and the ring gear 273, that are disposed near the fourth oil outlet 286 are lubricated. Furthermore, a portion of the oil discharged from the fourth oil outlet 286 passes through a fourth discharging hole 292 that is provided with the rotational shaft 272, and is discharged to the front of the rotational shaft 272.

The oil that has reached a connection position between the main passage and the fifth branch passage flows from the main passage into the fifth branch passage (i.e., fifth propeller shaft hole 288). The oil that has flowed into the fifth branch passage passes through the propeller shaft 213 in the radial direction, and is then discharged to the periphery of the propeller shaft 213 from the fifth oil outlet 289 disposed inside the bearing B7 in the radial direction. As a result, the bearing B7 disposed in front of the flange portion 52, the bearing B12 disposed between the sun gear 275 and the propeller shaft 213, etc., are lubricated.

Next, the transmission of a thrust from the propeller 14 to the lower case 19 will be described.

A thrust in the forward direction generated by the propeller 14 is transmitted to the flange portion 52 of the propeller shaft 213 through the shaft portion 51 of the propeller shaft 213. As shown by black arrows in FIG. 8, the forward-direction thrust transmitted to the flange portion 52 is transmitted through the bearing B7 to the inner peripheral portion of the lid 253 fixed to the housing 254 by a bolt, for example. Thereafter, the forward-direction thrust transmitted to the lid 253 is transmitted to the rearward stepped portion 19f of the lower case 19 through a bolt attachment portion 54e of the housing 254 fixed to the lower case 19 by a bolt, for example. As a result, the forward-direction thrust is transmitted from the vessel propulsion apparatus 201 to the hull H1, and the hull H1 is propelled forwardly.

On the other hand, a thrust in the backward direction generated by the propeller 14 is transmitted to the flange portion 52 of the propeller shaft 213 through the shaft portion 51 of the propeller shaft 213. The backward-direction thrust transmitted to the flange portion 52 is transmitted to a rear supporting portion 54d of the housing 254 through the bearing B8. Thereafter, the backward-direction thrust transmitted to the housing 254 is transmitted to the lower case 19 through the bolt attachment portion 54e of the housing 254. As a result, the backward-direction thrust is transmitted from the vessel propulsion apparatus 201 to the hull H1, and the hull H1 is propelled backwardly.

As described above, the forward-direction thrust is transmitted to the lower case 19 through the flange portion 52, the bearing B7, the lid 253, and the housing 254. Likewise, the backward-direction thrust is transmitted to the lower case 19 through the flange portion 52, the bearing B8, and the housing 254. Therefore, a thrust that is transmitted to the intermediate shaft 212 is cut off or reduced. Therefore, a force that is applied to the front and rear gears 23 and 24 is smaller than in an example in which all thrust is transmitted to the intermediate shaft 212. Therefore, a load applied onto the thrust bearing B3 supporting the front gear 23 is reduced.

As described above, in the second preferred embodiment, the rotation transmitted from the dog clutch 25 to the propeller 14 is decelerated by the planetary gear mechanism 271 that is an example of a decelerating mechanism. As a result, the torque transmitted to the propeller 14 increases. The planetary gear mechanism 271 includes the gears (the ring gear 273, the planet gear 274, and the sun gear 275) that are movable with respect to the lower case 19 containing the front gear 23 and the like. The planetary gear mechanism 271 is disposed in a space behind the rear gear 24. The oil outlets 281, 286, 289 of the oil passage 256 are disposed in a space behind the rear gear 24. Therefore, oil is reliably supplied to the planetary gear mechanism 271.

Additionally, in the second preferred embodiment, the propeller shaft 213 is spline-coupled to the intermediate shaft 212 through the rotational shaft 272. When the propeller 14 generates a forward-direction thrust and a backward-direction thrust, the thrust transmitted to the propeller shaft 213 is mainly transmitted to the lower case 19 through the flange portion 52, and thus a thrust that is transmitted to the intermediate shaft 212 is cut off or reduced. Therefore, a force that is applied to the front and rear gears 23 and 24 is smaller than in an example in which all thrust is transmitted to the intermediate shaft 212.

Third Preferred Embodiment

Figure 9:
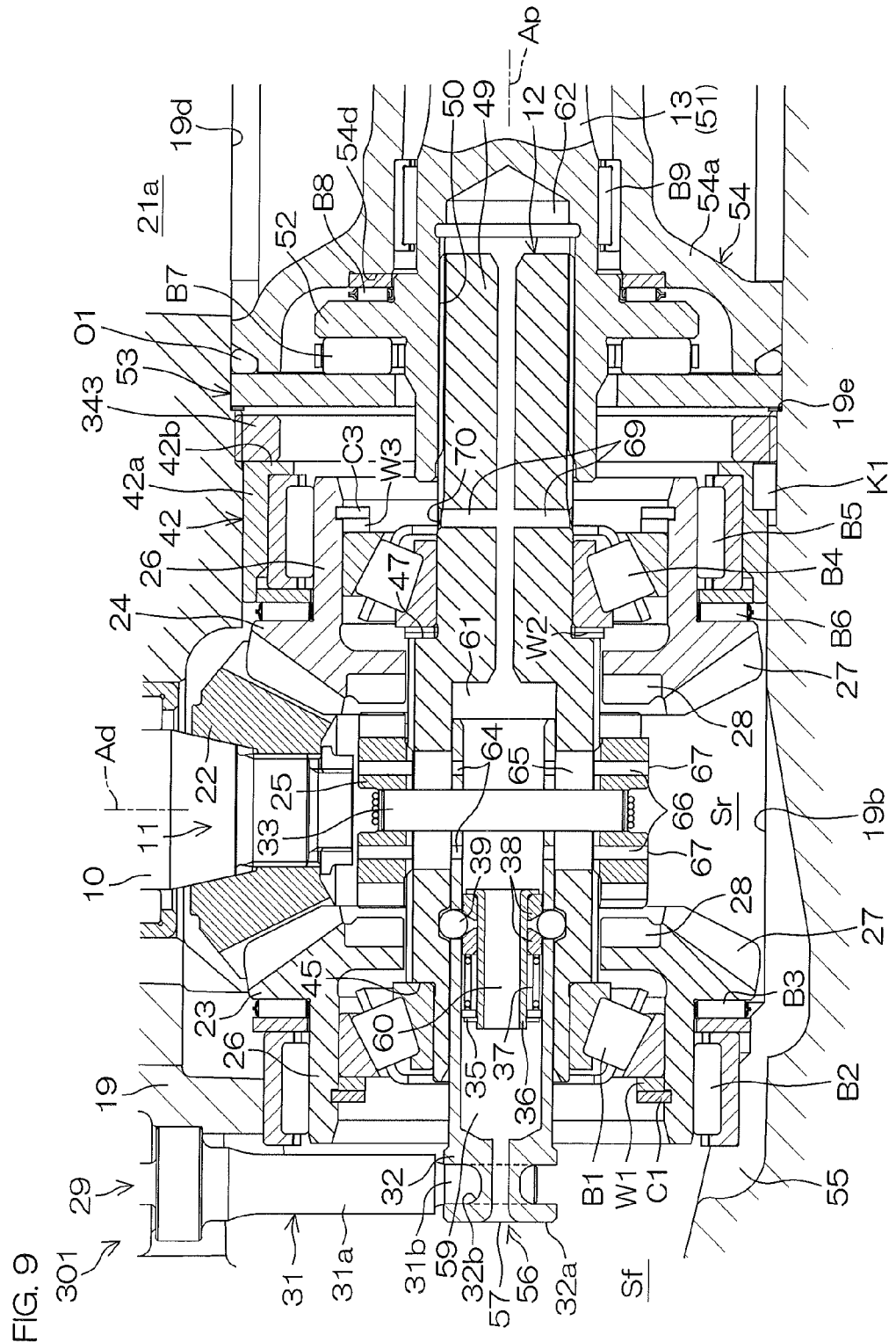
FIG. 9 is a cross-sectional view showing the inside of a lower unit of an outboard motor according to a third preferred embodiment of the present invention.

Next, a third preferred embodiment of the present invention will be described. In FIG. 9 mentioned below, the same reference sign as in FIG. 1 to FIG. 8 is given to a component equivalent to each component shown in FIG. 1 to FIG. 8, and a description of the component is omitted.

A vessel propulsion apparatus 301 according to the third preferred embodiment is provided with a pressing member 343 that prevents the holder 42 from moving rearwardly with respect to the lower case 19 and a circlip C3 that prevents the bearing B4 from moving rearwardly with respect to the rear gear 24, instead of the pressing member 43 and the circlip C2 according to the first preferred embodiment. Preloaded relay members according to the third preferred embodiment of the present invention include the holder 42, the bearing B5, and the bearing B6.

As shown in FIG. 9, the pressing member 343 is disposed outside the rear gear 24. Therefore, the pressing member 343 is disposed outside the bearing B4 disposed in the rear gear 24 in the radial direction. The inner diameter of the pressing member 343 is greater than the outer diameter of the cylindrical portion 26 of the rear gear 24. The pressing member 343 surrounds the intermediate shaft 12 and the propeller shaft 13 around the propeller axis Ap. The pressing member 343 is screwed to the lower case 19 by a male screw portion disposed at the pressing member 343 and by a female screw portion disposed at the inner surface 19b. The pressing member 343 is disposed at a more rearward position than the holder 42 and at a more forward position than the lid 53. The pressing member 343 and the lid 53 are spaced in the front-rear direction.

The circlip C3 is disposed in the cylindrical portion 26 of the rear gear 24. The circlip C3 surrounds the intermediate shaft 12 around the propeller axis Ap. The circlip C3 opposes the second oil outlet 70 in the radial direction. The circlip C3 is disposed behind an outer ring of the bearing B4. The circlip C3 is fitted to an attachment groove provided with the rear gear 24, and is prevented from moving in the front-rear direction with respect to the rear gear 24. The circlip C3 may support the outer ring of the bearing B4 with the annular washer W3 shown in FIG. 9 therebetween, or may support the outer ring of the bearing B4 directly. The outer ring of the bearing B4 is prevented from moving rearwardly with respect to the rear gear 24 by the circlip C3.

The pressing member 343 presses the holder 42 forwardly. The bearing B5 and the bearing B6 disposed around the rear gear 24 are forwardly pressed by the pressing member 343 through the holder 42. A force (preload) with which the pressing member 343 forwardly presses the holder 42 is transmitted to the bearing B4 through the rear gear 24 and the circlip C3. Additionally, this force (preload) is transmitted to the bearing B1 through the intermediate shaft 12. Still additionally, this force (preload) is transmitted to the bearings B2 and B3 disposed around the front gear 23 through the circlip C1 and the front gear 23. As a result, the bearings B1 to B6 are preloaded, and an inner gap is removed.

As described above, in the third preferred embodiment, the pressing member 343 is screwed to the lower case 19. Therefore, the bearing B4 is pressed in the front-rear direction with respect to the lower case 19. The pressing member 343 is disposed at a more outward position than the bearing B4. Therefore, the pressing member 343 is larger in size than in an example in which the pressing member 343 is disposed behind the bearing B4. There is a possibility that the machining of the pressing member 343 will be difficult if the pressing member 343 has a small size. Therefore, an increase in the machining difficulty is prevented by enlarging the size of the pressing member 343.

Additionally, in the third preferred embodiment, the pressing member 343 is disposed at a more outward position than the bearing B4 disposed between the rear gear 24 and the intermediate shaft 12. A preload is transmitted from the pressing member 343 to the rear gear 24 through the holder 42, the bearing B5, and the bearing B6 that are disposed around the rear gear 24. Thereafter, the preload is transmitted from the rear gear 24 to the bearing B4. As a result, an inner gap of the bearing B4 is removed. Therefore, the rear gear 24 is held such that the rear gear 24 does not perform any operations, such as inclination, other than rotation. Therefore, the engagement between the drive gear 22 and the rear gear 24 is prevented from being destabilized.

Other Preferred Embodiments

Although the first to third preferred embodiments of the present invention have been described above, the present invention is not restricted to the contents of the first to third preferred embodiments and various modifications are possible within the scope of the present invention.

For example, as described above, in the first to third preferred embodiments, the oil inlet 57 is preferably disposed in front of the front gear 23. However, the oil inlet 57 may be disposed inside the front gear 23.

As described above, in the first to third preferred embodiments, the oil inlet 57 is preferably open at the front end surface 32a of the shift slider 32. However, the oil inlet 57 may be open at a position, such as the outer peripheral surface of the shift slider 32, other than the front end surface 32a.

As described above, in the first to third preferred embodiments, the oil inlet 57 preferably intersects the propeller axis Ap. However, the oil inlet 57 is not necessarily required to intersect the propeller axis Ap.

As described above, in the first to third preferred embodiments, all oil outlets are preferably disposed outside the oil inlet 57 in the radial direction. However, when the oil inlet 57 is disposed around the propeller axis Ap, at least one oil outlet may be disposed inside the oil inlet 57 in the radial direction.

As described above, in the first to third preferred embodiments, the oil outlet is preferably disposed in the space between the front gear 23 and the rear gear 24, and in the space in the rear gear 24, and in the space behind the rear gear 24. However, the oil outlet may be disposed in only one or two spaces of the three spaces.

As described above, in the first to third preferred embodiments, the oil passage 56 preferably extends from the inner periphery of the dog clutch 25 to the outer periphery of the dog clutch 25. However, a portion (first clutch hole 66) of the oil passage 56 that passes through the dog clutch 25 in the radial direction may be excluded. In this case, oil in the oil passage 56 is discharged from the first intermediate shaft hole 65 that is open at the outer peripheral surface of the intermediate shaft 12.

As described above, in the first to third preferred embodiments, the pressing member 43 or the pressing member 343 that applies the preload to the bearings B1 and B4 is preferably provided. However, the pressing member 43 and the pressing member 343 may be excluded.

As described above, in the first to third preferred embodiments, the pressing member 43 and the pressing member 343 preferably apply the preload to both the bearing B1 and the bearing B4. However, the pressing member 43 and the pressing member 343 may apply the preload to either the bearing B1 or the bearing B4.

As described above, in the first to third preferred embodiments, the pressing member 43 and the pressing member 343 are preferably screwed to the rear gear 24 or to the lowercase 19. However, the pressing member 43 and the pressing member 343 may be fixed to the rear gear 24 or the lower case 19 by a method other than by using screws. For example, the pressing member 43 and the pressing member 343 may be located at the rear gear 24 or at the lower case 19 by a circlip.

As described above, in the third preferred embodiment, the pressing member 343 and the circlip C3 according to the third preferred embodiment are preferably used instead of the pressing member 43 and the circlip C2 according to the first preferred embodiment. However, the pressing member 343 and the circlip C3 may be installed in the vessel propulsion apparatus 201 according to the second preferred embodiment.

As described above, in the first to third preferred embodiments, the bearing B1 is preferably a tapered roller bearing. However, the type of the bearing B1 is not necessarily required to be a tapered roller bearing. The same applies to the bearing B2 to the bearing B12.

Also, features of two or more of the various preferred embodiments described above may be combined.

The present application corresponds to Japanese Patent Application No. 2014-22475 filed on Feb. 7, 2014 in the Japan Patent Office, and the entire disclosure of this application is incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vessel propulsion apparatus comprising:
a prime mover that generates power by which a propeller is rotated;
a drive shaft rotationally driven by the prime mover;
a drive gear connected to the drive shaft;
a front gear that engages the drive gear;
a rear gear that engages the drive gear and that is disposed behind the front gear;
a dog clutch that moves in a front-rear direction of the vessel propulsion apparatus between an engagement position in which the dog clutch engages either the front gear or the rear gear and a non-engagement position in which the dog clutch engages neither the front gear nor the rear gear; and
an oil passage passing through an inside of the front gear and that guides oil from a forward space in front of the front gear to a rearward space behind the front gear.

2. The vessel propulsion apparatus according to claim 1, wherein the oil passage includes an oil inlet disposed in front of the front gear.

3. The vessel propulsion apparatus according to claim 2, further comprising a shift slider that rotates together with the dog clutch around a propeller axis extending in the front-rear direction and that moves in the front-rear direction together with the dog clutch, wherein the oil inlet is open at a front end surface of the shift slider.

4. The vessel propulsion apparatus according to claim 3, wherein the oil inlet is disposed along the propeller axis.

5. The vessel propulsion apparatus according to claim 3, wherein the oil passage further includes an oil outlet disposed behind the front gear and that discharges oil that has flowed into the oil inlet, and the oil outlet is disposed at a more outward position than the oil inlet in a radial direction of the shift slider.

6. The vessel propulsion apparatus according to claim 2, further comprising:
a shift slider that rotates together with the dog clutch around a propeller axis extending in the front-rear direction and that moves together with the dog clutch in the front-rear direction; and
a sleeve extending in the front-rear direction in the shift slider; wherein
a portion of the oil passage is defined by the sleeve.

7. The vessel propulsion apparatus according to claim 1, wherein the rearward space includes a space between the front gear and the rear gear in the front-rear direction; and the oil passage includes an oil outlet disposed between the front gear and the rear gear in the front-rear direction.

8. The vessel propulsion apparatus according to claim 1, wherein the rearward space includes a space behind the rear gear, and the oil passage includes an oil outlet disposed behind the rear gear.

9. The vessel propulsion apparatus according to claim 8, further comprising a decelerating mechanism that decelerates rotation transmitted to the dog clutch from either the front gear or the rear gear and that transmits decelerated rotation toward the propeller, wherein the decelerating mechanism is disposed behind the rear gear.

10. The vessel propulsion apparatus according to claim 9, wherein the decelerating mechanism is a planetary gear mechanism, and the planetary pear mechanism includes a sun gear, a plurality of planet gears disposed around the sun gear, a ring gear disposed around the plurality of planet gears, and a carrier that rotatably holds the plurality of planet gears.

11. The vessel propulsion apparatus according to claim 9, wherein a portion of the oil passage is defined by the decelerating mechanism.

12. The vessel propulsion apparatus according to claim 1, further comprising a propeller shaft that rotates together with the propeller around a propeller axis extending in the front-rear direction, wherein a portion of the oil passage is defined by the propeller shaft.

\* \* \* \* \*